US012705780B2

(12) United States Patent
Isshiki et al.

(10) Patent No.: US 12,705,780 B2
(45) Date of Patent: Aug. 11, 2026

(54) LEARNING APPARATUS, LEARNING METHOD, IMAGING APPARATUS, SIGNAL PROCESSING APPARATUS, AND SIGNAL PROCESSING METHOD

(71) Applicant: Sony Semiconductor Solutions Corporation, Kanagawa (JP)

(72) Inventors: Akitoshi Isshiki, Kanagawa (JP); Keita Ishikawa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 223 days.

(21) Appl. No.: 18/253,924

(22) PCT Filed: Nov. 18, 2021

(86) PCT No.: PCT/JP2021/042468

§ 371 (c)(1),
(2) Date: May 23, 2023

(87) PCT Pub. No.: WO2022/113883

PCT Pub. Date: Jun. 2, 2022

(65) Prior Publication Data

US 2024/0005550 A1 Jan. 4, 2024

(30) Foreign Application Priority Data

Nov. 30, 2020 (JP) ................................ 2020-198887

(51) Int. Cl.
*G06T 7/70* (2017.01)
*G06V 10/771* (2022.01)

(52) U.S. Cl.
CPC .............. *G06T 7/70* (2017.01); *G06V 10/771* (2022.01); *G06T 2207/20081* (2013.01); *G06T 2207/20084* (2013.01); *G06V 2201/07* (2022.01)

(58) Field of Classification Search
CPC ........... G06N 3/08; G06T 2207/20081; G06T 2207/20084; G06T 7/70; G06V 10/454; G06V 10/50; G06V 10/771; G06V 10/774; G06V 2201/07
See application file for complete search history.

(56) References Cited

U.S. PATENT DOCUMENTS

2019/0087673 A1* 3/2019 Li .......................... G06N 3/084
2020/0311481 A1* 10/2020 Tong .................... G06V 10/774
2020/0402666 A1* 12/2020 Wang ..................... G16H 50/20
(Continued)

FOREIGN PATENT DOCUMENTS

CN 109508580 A 3/2019
CN 110533068 A 12/2019
(Continued)

OTHER PUBLICATIONS

International Search Report and Written Opinion mailed on Feb. 8, 2022, received for PCT Application PCT/JP2021/042468, filed on Nov. 18, 2021, 9 pages including English Translation.

*Primary Examiner* — Zhiyu Lu
(74) *Attorney, Agent, or Firm* — XSENSUS LLP

(57) ABSTRACT

A learning apparatus according to the present technology includes a learning unit that trains a CNN by using, as training data, a ground truth label prepared for each training image and ground-truth position information indicating a position of a target object in the training image.

17 Claims, 16 Drawing Sheets

(56) References Cited

U.S. PATENT DOCUMENTS

| | | | | |
|---|---|---|---|---|
| 2020/0410709 | A1* | 12/2020 | Suzuki | G06N 3/084 |
| 2021/0312674 | A1* | 10/2021 | Abrol | G06N 3/045 |
| 2022/0095267 | A1* | 3/2022 | Shafin | G01S 5/0278 |

FOREIGN PATENT DOCUMENTS

| | | | |
|---|---|---|---|
| CN | 111401296 | A | 7/2020 |
| JP | 2018-160799 | A | 10/2018 |
| JP | 2019-153092 | A | 9/2019 |
| JP | 2019-200772 | A | 11/2019 |
| JP | 2020-035103 | A | 3/2020 |
| JP | 2020-058800 | A | 4/2020 |

* cited by examiner

| | | |
|---|---|---|
| 0. 0 | 0. 2 | 0. 2 |
| 0. 2 | 0. 6 | 0. 5 |
| 0. 2 | 0. 7 | 0. 5 |

EXAMPLE OF FEATURE VALUE MAP

A

TRAINING IMAGE

GROUND TRUTH LABEL = 1: Person

B

| | | |
|---|---|---|
| 0. 2 | 0. 1 | 0. 0 |
| 0. 8 | 0. 2 | 0. 0 |
| 0. 8 | 0. 2 | 0. 0 |

GROUND-TRUTH POSITION INFORMATION

| | | |
|---|---|---|
| 0. 2 | 0. 1 | 0. 0 |
| 0. 8 | 0. 2 | 0. 0 |
| 0. 8 | 0. 2 | 0. 0 |

FEATURE VALUE MAP

B

| | | |
|---|---|---|
| 0 | 0 | 0 |
| 1 | 0 | 0 |
| 1 | 0 | 0 |

C

| | | |
|---|---|---|
| 0. 2 | 0. 1 | 0. 0 |
| 0. 8 | 0. 2 | 0. 0 |
| 0. 8 | 0. 2 | 0. 0 |

LEARNING APPARATUS, LEARNING METHOD, IMAGING APPARATUS, SIGNAL PROCESSING APPARATUS, AND SIGNAL PROCESSING METHOD

CROSS-REFERENCE TO RELATED APPLICATIONS

The present application is based on PCT filing PCT/JP2021/042468, filed Nov. 18, 2021, which claims priority to JP 2020-198887, filed Nov. 30, 2020, the entire contents of each are incorporated herein by reference.

TECHNICAL FIELD

The present technology relates to a learning apparatus, a learning method, an imaging apparatus, a signal processing apparatus, and a signal processing method, and particularly relates to a technology related to image recognition by a convolutional neural network (CNN).

BACKGROUND ART

For example, as described in Patent Document 1 below, in a case where an event is detected or a specific object is detected in an image sensor, high performance needs to be achieved with limited computational resources, know-how of a highly-skilled technician is required, and a feature value and image processing need to be considered for each scene to be applied. Therefore, there is room for improvement in versatility and detection accuracy.

Meanwhile, in recent years, convolutional neural network (CNN) technology typified by, for example, AlexNet, VGG-Net (VGG: visual geometry group), or the like has been widely spread. The CNN can obtain a target recognizer by performing learning processing on neural networks including multilayer filter processing such as convolution by using an image serving as training data.

In the image classification CNN, which is a type of CNN, high classification accuracy can be obtained for an image in which a target object appears large on a whole surface of the image, as in a Cifar 10 data set. However, for example, considering a daily scene of ordinary life, a scene where a target object appears in an entire image frame is exceptional, and thus, in a case of capturing an image of a daily scene, an object detection CNN represented by, for example, a single shot detector (SSD) is used.

Note that Patent Document 2 below can be cited as related conventional technology. Patent Document 2 discloses an improvement example of the image classification CNN. Specifically, Patent Document 2 discloses that accuracy of cause estimation of image classification is improved by adding processing with a Bayesian network or the like, in addition to CNN processing, thereby improving image classification accuracy. However, this method requires design and consideration of a Bayesian network and an additional computational resource, and thus, an advantage of CNN, which is versatility of being able to train a classifier (recognizer) by using training data solely, is lost. Furthermore, design of the Bayesian network requires work of a skilled person.

CITATION LIST

Patent Document

Patent Document 1: Japanese Patent Application Laid-Open No. 2018-160799

Patent Document 2: Japanese Patent Application Laid-Open No. 2020-35103

SUMMARY OF THE INVENTION

Problems to be Solved by the Invention

Here, the object detection CNN exemplified above can ensure high object recognition accuracy for any target scene, but requires object detection processing in addition to a feature value extraction CNN. Therefore, many computational resources (high-performance computing unit, a memory for holding half-computed processing, and the like) are required, and it is difficult to implement the object detection CNN under a condition where the computational resources are limited, such as in a case of implementing the object detection CNN on a sensor edge of an image sensor, or the like.

The present technology has been made in view of the above circumstances, and an object of the present technology is to improve object recognition accuracy while preventing an increase in the number of computational resources for an image recognizer using a CNN.

Solutions to Problems

A learning apparatus according to the present technology includes a learning unit that trains a convolutional neural network (CNN) by using, as training data, a ground truth label prepared for each training image and ground-truth position information indicating a position of a target object in the training image.

With this arrangement, as training of the CNN for image recognition, it possible to perform training in consideration of the position of the target object in an image.

In the learning apparatus according to the present technology described above, the learning unit can be configured to perform parameter update for the CNN on the basis of an inferred value error that is an error between an inferred value of the CNN with respect to the training image and the ground truth label, and a position error that is an error between a position of a target object in the training image, the position being indicated by a feature value map obtained in an intermediate layer of the CNN, and a position indicated by the ground-truth position information.

With this arrangement, the parameter update of the CNN at a time of learning is performed on the basis of the error between the position of the target object indicated by the feature value map and the ground-truth position.

In the learning apparatus according to the present technology described above, the learning unit can be configured to perform the parameter update on the basis of a combined error obtained by combining the inferred value error and the position error.

With this arrangement, when achieving a parameter update of the CNN based on the position error, it is not necessary to separately execute a (normal) parameter update based on the inferred value error and the parameter update based on the position error.

In the learning apparatus according to the present technology described above, the learning unit can be configured to perform the parameter update by using, as the combined error, a value obtained by weighting the inferred value error and the position error.

With this arrangement, as learning tendency of the CNN, it is possible to adjust whether to perform training with emphasis on global error information as the inferred value error, or to perform training with emphasis on error information for each region as the position error.

In the learning apparatus according to the present technology described above, the learning unit can be configured to perform the training using, as training data, the ground truth label and the ground-truth position information for each of target objects of different types.

With this arrangement, on a CNN that obtains an inference result for each of objects of different types such as a human, a dog, and a sofa for example, it is possible to perform training in consideration of the position of the target object in an image.

A learning method according to the present technology includes, by an information processing apparatus, training a convolutional neural network (CNN) by using, as training data, a ground truth label prepared for each training image and ground-truth position information indicating a position of a target object in the training image.

With such a learning method also, it is possible to obtain effects similar to effects of the learning apparatus according to the present technology described above.

Furthermore, an imaging apparatus according to the present technology includes a pixel array unit in which a plurality of pixels including a photoelectric conversion element is arranged, and an image sensor including a convolutional neural network (CNN) trained by using, as training data, a ground truth label prepared for each training image and ground-truth position information indicating a position of a target object in the training image, and including a signal processing unit that performs processing for image recognition on a captured image obtained by photoelectric conversion in the pixel array unit.

With this arrangement, in a case where a signal processing unit implemented in the image sensor and having less computational resources performs processing of image recognition with the CNN, it is possible to appropriately perform image recognition without performing object detection processing as in a case of the object detection CNN, even in a case where a scene where a target object does not necessarily appear in an entire image frame is a target.

The above-described imaging apparatus according to the present technology can be configured to further include a control unit that performs activation control of a predetermined unit in an own-apparatus on condition that a target object is recognized in the captured image by processing of image recognition using the CNN.

With this arrangement, it is possible to accurately perform, on the basis of a highly accurate image recognition result, control of activating the predetermined unit of the own-apparatus on condition that the target object is recognized, such as shifting a state of the own-apparatus from a sleep state to an activation state in response to the recognition of the target object in the captured image.

Furthermore, a signal processing apparatus according to the present technology includes a position detection unit that detects a position of a target object in an image on the basis of a feature value map obtained in an intermediate layer of a convolutional neural network (CNN).

Because the feature value map can be paraphrased as information indicating an index value of a feature value (feature index value) of target object for each region in the image, the position of the target object can be easily detected on the basis of the feature index value for each region. Specifically, because it is highly possible that the target object is positioned in a region having a high feature index value, the position of the target object can be easily detected on the basis of the index value for each region.

In the signal processing apparatus according to the present technology described above, the position detection unit can be configured to detect a position of the target object on the basis of a magnitude of a feature index value for each region in the feature value map.

In the feature value map, there is a high possibility that the target object is positioned in a region having a large feature index value.

In the signal processing apparatus according to the present technology described above, the position detection unit can be configured to detect, as the position of the target object, a position in which the feature index value is equal to or more than a threshold value.

With this arrangement, position detection of the target object is achieved by simple processing of threshold value determination on the feature index value.

In the signal processing apparatus according to the present technology described above, the position detection unit can be configured to detect, on the basis of the feature value map generated by the CNN for each of target objects of different types, a position of each the target objects in an image.

With this arrangement, for example, position detection for each of objects of different types, such as a human, a dog, and a sofa, is performed on the basis of a feature value map for each object.

The above-described signal processing apparatus according to the present technology can be configured to further include a scene estimation unit that performs scene estimation on the basis of a change aspect of a position of the target object detected by the position detection unit.

The scene described here is a scene related to a state of a target object, and examples thereof include a scene where a human as the target object is walking, a scene where a dog as the target object is running, and the like.

In the signal processing apparatus according to the present technology described above, the position detection unit can be configured to detect, on the basis of the feature value map generated by the CNN for each of target objects of different types, a position of each the target object in an image, and the scene estimation unit can be configured to perform scene estimation on the basis of a change aspect of a detected position for each the target object.

Examples of the scene estimation based on the change aspect of the detected position for each target object include estimation of, for example, a scene where a human and a dog are walking together (the dog is being taken for a walk), a scene where a human approaches and sits on a sofa, and the like.

The above-described signal processing apparatus according to the present technology can be configured to further include a control unit that performs, on condition that the target object is recognized at a specific position in an image on the basis of a result of position detection by the position detection unit, activation control of a predetermined unit.

With this arrangement, in addition to the target object appearing, it is possible to achieve the activation control of the predetermined unit, including a position where the target object appears as a condition.

A signal processing method according to the present technology is a signal processing method in which a signal processing apparatus detects a position of a target object in an image on the basis of a feature value map obtained in an intermediate layer of a convolutional neural network (CNN).

With such a signal processing method also, it is possible to obtain effects similar to effects of the signal processing apparatus according to the present technology described above.

BRIEF DESCRIPTION OF DRAWINGS

FIG. 10 is an explanatory diagram of a position detection technique as an embodiment.

MODE FOR CARRYING OUT THE INVENTION

Hereinafter, embodiments will be described in the following order.

<1. First embodiment>

(1-1. Configuration example of signal processing apparatus)

(1-2. Learning technique as embodiment)

<2. Second embodiment>

<3. Third embodiment>

<4. Modifications>

<5. Conclusion of embodiments>

<6. Present technology>

1. First Embodiment

1-1. Configuration Example of Signal Processing Apparatus

Figure 1:
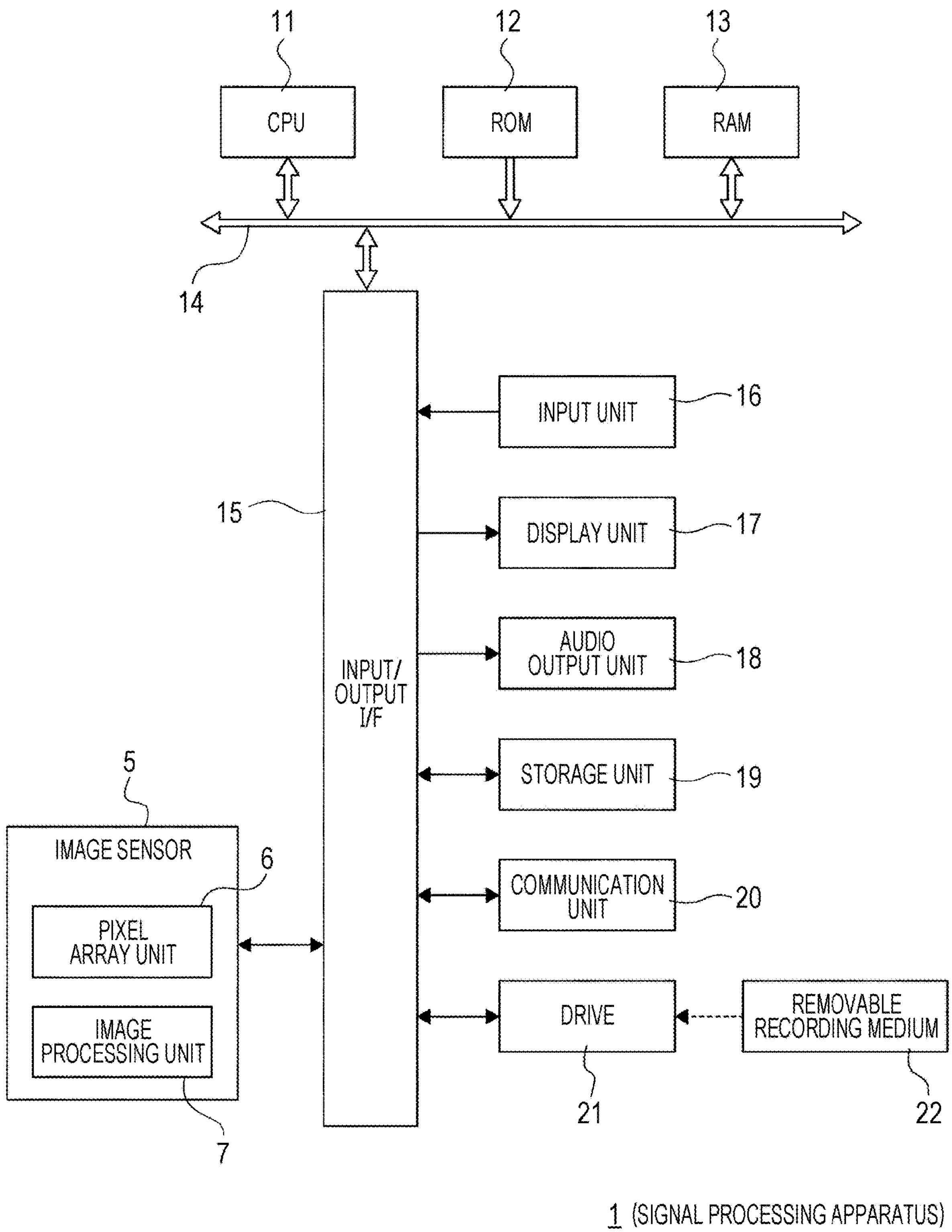
FIG. 1 is a block diagram illustrating a configuration example of a signal processing apparatus as a first embodiment according to the present technology.

FIG. 1 is a block diagram illustrating a configuration example of a signal processing apparatus 1 as a first embodiment according to the present technology. Here, the signal processing apparatus 1 is an embodiment of an imaging apparatus according to the present technology.

As a specific apparatus form of the signal processing apparatus 1, for example, an information processing apparatus having portability such as a smartphone, a tablet terminal, or a notebook personal computer, or the like is conceivable.

In FIG. 1, a CPU 11 of the signal processing apparatus 1 executes various kinds of processing according to a program stored in a ROM 12 or a program loaded from a storage unit 19 to a RAM 13. As appropriate, the RAM 13 also stores data necessary for the CPU 11 to execute various kinds of processing.

The CPU 11, the ROM 12, and the RAM 13 are mutually connected via a bus 14. Furthermore, an input/output interface 15 is connected to the bus 14.

An input unit 16 including an operation element and an operation device is connected to the input/output interface 15. For example, as the input unit 16, various operation elements and operation devices such as a keyboard, a mouse, a key, a dial, a touch panel, a touch pad, and a remote controller are assumed.

Operation by a user is sensed by the input unit 16, and a signal corresponding to the input operation is interpreted by the CPU 11.

Furthermore, a display unit 17 including a liquid crystal display (LCD), an organic electro-luminescence (EL) panel, or the like, and an audio output unit 18 including a speaker or the like are integrally or separately connected to the input/output interface 15.

The display unit 17 is a display unit that performs various kinds of information display, and includes, for example, a display device provided in a housing of the signal processing apparatus 1, a separate display device connected to the signal processing apparatus 1, or the like.

On the basis of an instruction from the CPU 11, the display unit 17 executes display of an image for various kinds of image processing, a moving image to be processed, or the like, on a display screen.

Furthermore, the display unit 17 displays various operation menus, icons, messages, and the like, that is, displays as a graphical user interface (GUI), on the basis of the instruction from the CPU 11.

Moreover, in the present example, on the basis of the instruction from the CPU 11, the display unit 17 can display a captured image as a so-called through image, the captured image being obtained by an image sensor 5 to be described later.

The storage unit 19 including a hard disk, a solid-state memory, or the like, and a communication unit 20 including a modem or the like may be connected to the input/output interface 15.

The communication unit 20 performs communication with communication processing via a transmission line such as the Internet, wired/wireless communication with various devices, bus communication, or the like.

Furthermore, a drive 21 is also connected to the input/output interface 15 as necessary, and a removable recording medium 22, such as a magnetic disk, an optical disk, a magneto-optical disk, or a semiconductor memory, is appropriately mounted.

The drive 21 can read a data file such as an image file, various computer programs, and the like from the removable recording medium 22. The read data file is stored in the storage unit 19, and an image or audio included in the data file is output by the display unit 17 or the audio output unit 18. Furthermore, a computer program or the like read from the removable recording medium 22 is installed in the storage unit 19 as necessary.

Note that, in the signal processing apparatus 1, software can be installed via network communication by the communication unit 20. Alternatively, the software may be stored in advance in the ROM 12, the storage unit 19, or the like.

The image sensor 5 is configured as, for example, a charge-coupled device (CCD) sensor, a complementary metal oxide semiconductor (CMOS) sensor, or the like, and converts received light into an electric signal to obtain a captured image.

The image sensor 5 includes a pixel array unit 6 and an image processing unit 7.

The pixel array unit 6 includes a plurality of pixels having photoelectric conversion elements. In the present example, the plurality of pixels is two-dimensionally arranged.

The image processing unit 7 is configured to be able to read a charge signal obtained with photoelectric conversion of each of the pixels in the pixel array unit 6 and perform various kinds of processing on the captured image based on a read signal. In particular, the image processing unit 7 of the present example is configured to be able to perform image recognition processing utilizing technology of artificial intelligence (AI) as processing on the captured image, which will be described later.

Here, in the image sensor 5 in the present example, the image processing unit 7 that processes a captured image is integrally formed with the pixel array unit 6. Specifically, in the present example, the image sensor 5 adopts a configuration in which a semiconductor substrate having an electronic circuit that functions as the image processing unit 7 is bonded to a semiconductor substrate on which photoelectric conversion elements for the respective pixels are formed.

For example, the image sensor 5 is a back-illuminated image sensor, and adopts a configuration in which the semiconductor substrate on which the electronic circuit of the image processing unit 7 is formed is bond to a front surface side (opposite side to a light incidence plane) of the semiconductor substrate on which photoelectric conversion elements are formed.

Figure 2:
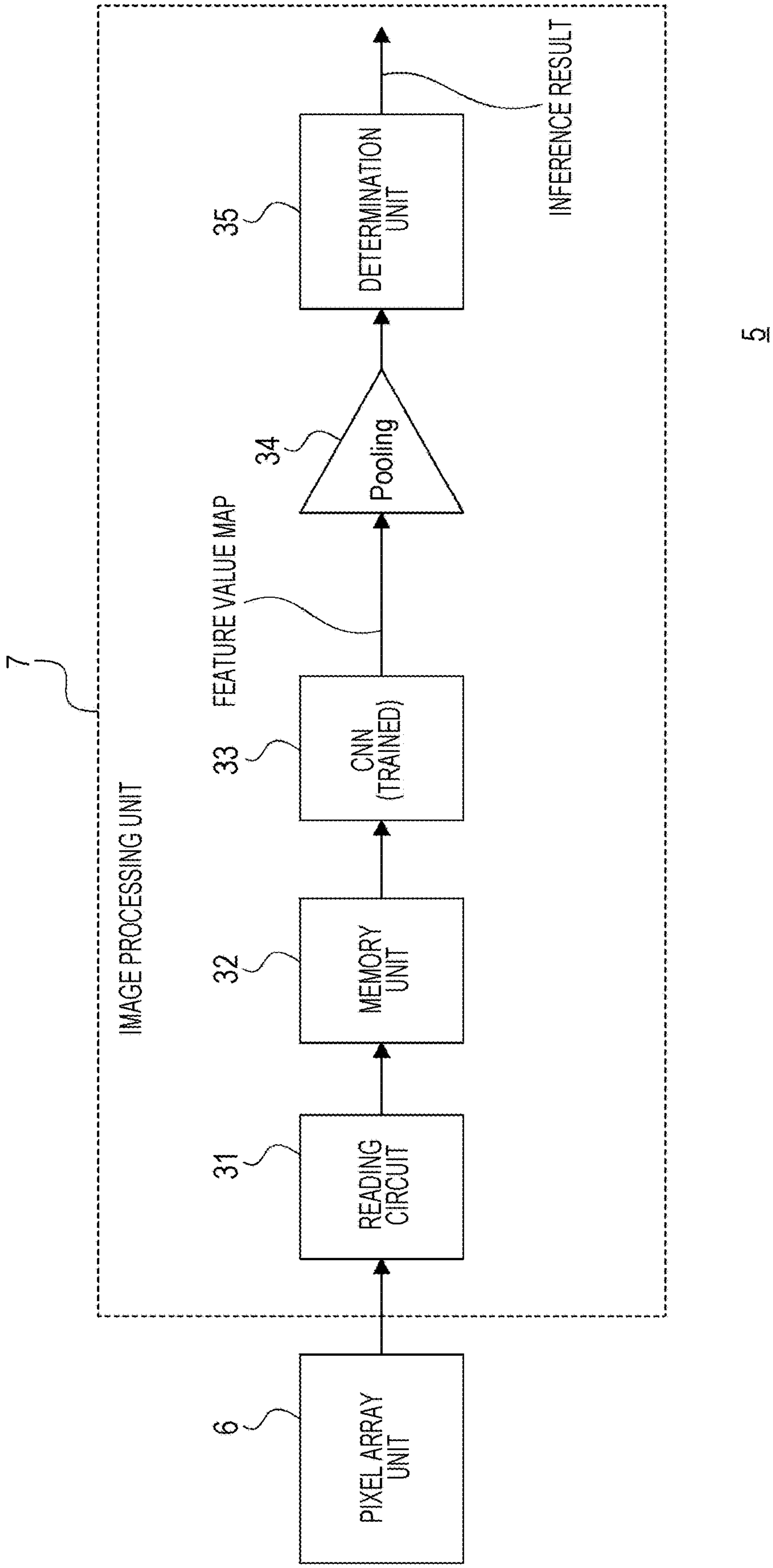
FIG. 2 is a block diagram for describing a configuration example of an image processing unit in the first embodiment.

FIG. 2 is a block diagram for describing a configuration example of the image processing unit 7 in the image sensor 5. Note that FIG. 2 illustrates the pixel array unit 6 together with an internal configuration example of the image processing unit 7.

As illustrated, the image processing unit 7 includes a reading circuit 31, a memory unit 32, a convolutional neural network (CNN) 33, a pooling unit 34, and a determination unit 35.

The reading circuit 31 reads the charge signal obtained by photoelectric conversion of each of the pixels in the pixel array unit 6 and performs analog to digital (A/D) conversion. The A/D-converted signal is referred to as a read signal.

The memory unit 32 temporarily holds a read signal by the reading circuit 31. In the memory unit 32, read signals for a plurality of horizontal lines are held, for example. In other words, at least a part of the captured image obtained by photoelectric conversion in the pixel array unit 6 is held.

The CNN 33 is configured as an image recognizer based on a CNN trained so as to be able to perform image recognition processing for recognizing a target object from an input image, and performs processing for image recognition using a captured image held in the memory unit 32 as an input image.

In the present example, because the image processing unit 7 is implemented in the image sensor 5 and is in an environment with relatively poor computational resources, for example, MobileNet is adopted as a relatively lightweight AI engine for the CNN 33.

A pooling unit 34 inputs a feature value map obtained in an intermediate layer of the CNN 33 and performs max pooling processing.

The feature value map is obtained by performing, in the CNN 33, a convolution operation (convolution) based on the input image. Specifically, the feature value map is obtained by performing, on a target image, a convolution operation using a kernel (filter) with a predetermined size such as 3×3, for example.

The feature value map can be paraphrased as information indicating a feature index value (index value of a feature value of a target object) in each region of the input image (refer to FIG. 5 to be described later).

The max pooling processing by the pooling unit 34 is processing of selecting a maximum value from among feature index values for each region (each grid) of such a feature value map.

The determination unit 35 inputs, as an "inferred value", the feature index value obtained by the pooling unit 34 with the max pooling processing, and determines, on the basis of the inferred value, whether or not the target object has been recognized in the input image. For example, if the inferred value is a predetermined threshold value or more, a determination result indicating that the target object has been recognized is obtained, and if the inferred value is less than the threshold value, a determination result indicating that the target object has not been recognized is obtained.

A determination result by the determination unit 35 can be rephrased as information indicating a result of inference as to whether or not a target object has been recognized, and thus, hereinafter, may be referred to as an "inference result".

Figure 3:
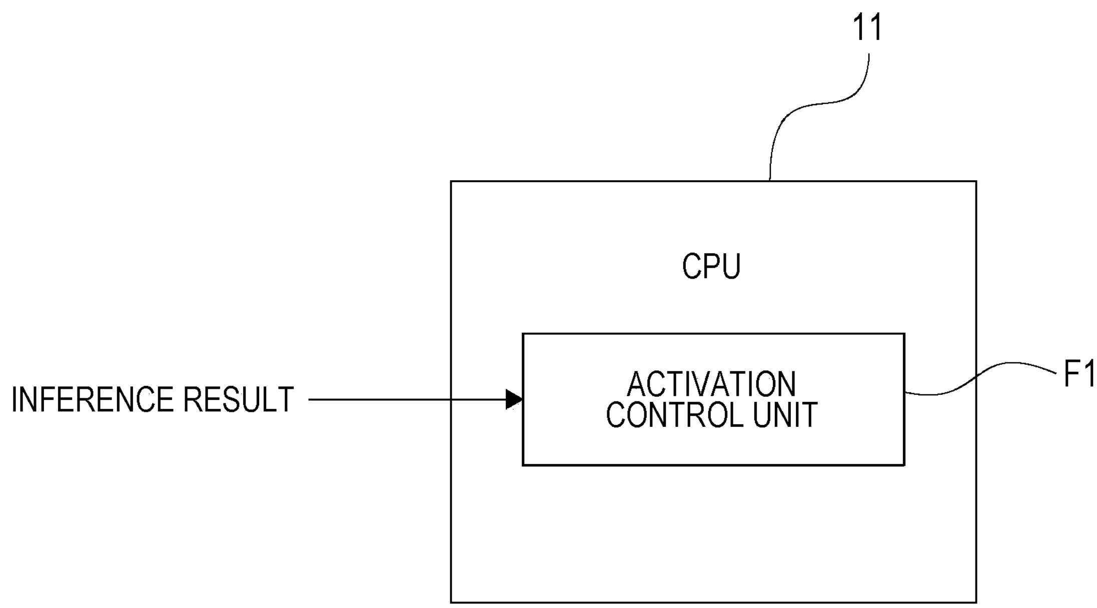
FIG. 3 is a functional block diagram for describing functions of the signal processing apparatus as the first embodiment.

FIG. 3 is a functional block diagram for describing functions of the CPU 11 of the signal processing apparatus 1 as the first embodiment.

As illustrated, the CPU 11 has functions as an activation control unit F1. The activation control unit F1 performs activation control of a predetermined unit in the own-apparatus (signal processing apparatus 1) on the basis of a result of inference by the determination unit illustrated in FIG. 2.

In the present example, when the signal processing apparatus 1 (for example, a smartphone, a tablet terminal, or the like) is in a sleep state, the CPU 11 causes the image sensor 5 to execute imaging operation and the image processing unit 7 to execute image recognition processing (processing of recognizing the target object by the CNN 33, the pooling unit 34, and the determination unit 35). Then, on condition that the target object is recognized in the captured image on the basis of an inference result obtained by the image recognition processing in such a sleep state, the activation control unit F1 performs activation control from the sleep state. Specifically, for example, the activation control is performed on a unit, such as the display unit 17, which is determined to be activated when transitioning from the sleep state to an apparatus activation state.

Note that the display unit 17 exemplified above is merely an example of units as targets of activation control based on a result of the image recognition processing using the CNN 33, and thus various target units are conceivable, not limited to specific units. Furthermore, the activation control is not limited to being performed for activation from the sleep state, and can be widely applied in various situations.

1-2. Learning Technique as Embodiment

Figure 4:
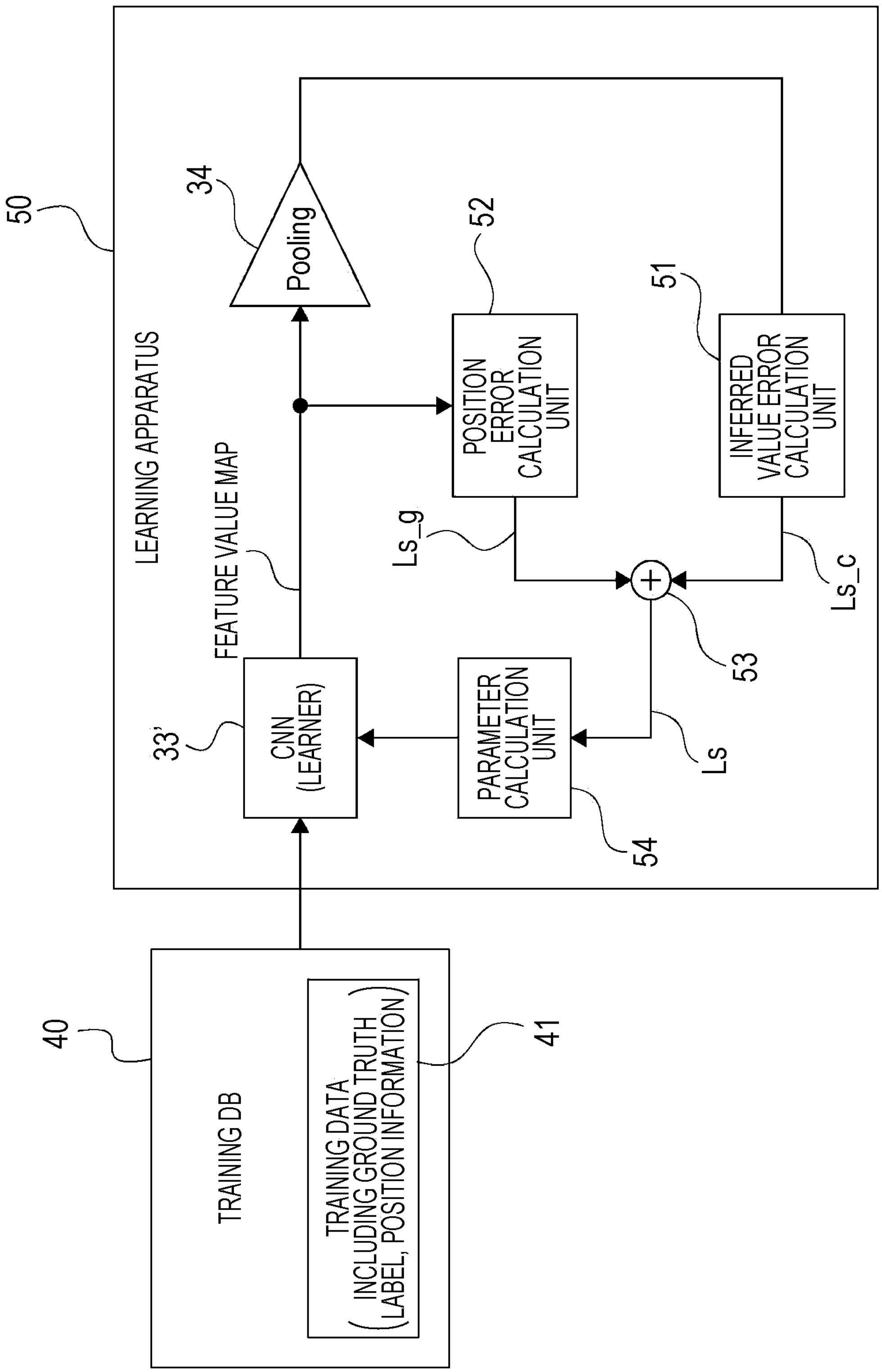
FIG. 4 is an explanatory diagram of a system configuration for learning according to the first embodiment.

Next, training of the CNN 33 will be described. FIG. 4 is an explanatory diagram of a system configuration for learning according to the first embodiment.

For the learning, a training database (DB) 40 and a learning apparatus 50 are used as illustrated in the drawing.

A training DB 40 stores training data 41 together with images for training (not illustrated: hereinafter referred to as "training images"). As the training images, an image including the target object and an image not including the target object are used. In the present example, the target object is, for example, "human". The training data 41 comprehensively represents ground-truth data for each training image.

In the present example, as the training data 41, ground-truth position information is used together with information about a ground truth label. In the present example, for the ground truth label, for example, "1" is used in a case where the target training image is an image including the target object, and for example, "0" is used for an image not including the target object.

The ground-truth position information is information indicating a position of the target object in a target training image.

The ground truth label and the ground-truth position information will be described with reference to FIGS. 5 and 6.

Figures 5, 6:
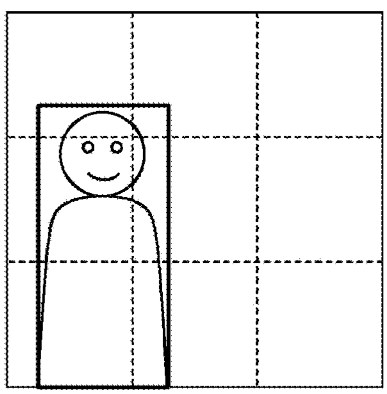
FIG. 5 is a diagram illustrating an example of a feature value map.
FIG. 6 is an explanatory diagram of a ground truth label and ground-truth position information according to an embodiment.

FIG. 5 is a diagram illustrating an example of a feature value map.

As described above, the feature value map can be represented as information indicating a feature index value of the target object for each region in the input image. The feature index value is calculated as a value having "1" as a maximum value.

At this time, which area of the input image one square of region (grid) in the feature value map corresponds to changes depending on a feature value map in which intermediate layer in the CNN 33 is used for the feature value map.

FIG. 6 is an explanatory diagram of a ground truth label and ground-truth position information.

FIG. 6A exemplifies a training image including a human as the target object. An area including the human as the target object is the area surrounded by a thick frame in the drawing.

A training image including the target object in this manner is associated with "1" as information about the ground truth label.

FIG. 6B exemplifies ground-truth position information associated with the training image exemplified in FIG. 6A. The ground-truth position information is generated on the basis of a target training image, information about an area in the training image, the area including the target object (hereinafter referred to as a "target object area"), and region correspondence information indicating correspondence as to which area in the training image each region (grid) of the feature value map corresponds to. In FIG. 6A, such region correspondence between the feature value map and the training image is represented by division lines indicated by broken lines.

Specifically, in generating ground-truth position information, a degree of overlapping the target object area is calculated for each corresponding region of each grid of the feature value map in the training image. At this time, an overlapping degree is calculated on an assumption that a case where an entire region overlaps a target object area is represented as a maximum value of overlapping degree=1.0.

Then, information about overlapping degrees calculated for each corresponding region in this manner, in other words, information about the overlapping degrees calculated for each grid of the feature value map is obtained as ground-truth position information.

Note that ground-truth position information about a training image not including the target object is generated as information indicating that an overlapping degree of each grid is "0".

In FIG. 4, the learning apparatus 50 includes a CNN 33' (a learner for obtaining a recognition algorithm in the CNN 33) and the pooling unit 34, and also includes an inferred value error calculation unit 51, a position error calculation unit 52, a combining unit 53, and a parameter calculation unit 54.

As a learner, the CNN 33' has a function of updating various kinds of parameters (for example, a weighting factor of a filter used in a convolution operation, or the like) related to image recognition processing.

In a case where the input image serves as a training image, the pooling unit 34 performs max pooling processing on the feature value map obtained in the intermediate layer of the CNN 33'.

The inferred value error calculation unit 51 inputs the inferred value, which is obtained in the pooling unit 34, with respect to an input of the training image, and calculates an inferred value error Ls_c that is an error between the inferred value and the ground truth label. Specifically, the inferred value error calculation unit 51 calculates, as the inferred value error Ls_c, an error (difference) between the inferred value obtained by the pooling unit 34 and a value of the ground truth label corresponding to the training image for which the inferred value has been obtained.

The position error calculation unit 52 inputs the feature value map, which is obtained in the intermediate layer of the CNN 33', with respect to the input of the training image, and calculates a position error Ls_g that is an error between a position of the target object indicated by the feature value map and a position indicated by the ground-truth position information. Specifically, the position error calculation unit 52 calculates, as the position error Ls_g, an error between the feature value map obtained in the intermediate layer of the CNN 33' and ground-truth position information corresponding to the training image for which the feature value map is obtained. For example, it is conceivable to calculate a difference value between an overlapping degree and a feature index value for each grid between the feature value map and the ground-truth position information, and calculate a total value of the difference values as the position error Ls_g.

The combining unit 53 calculates a combined error Ls obtained by combining (for example, adding) the inferred value error Ls_c obtained by the inferred value error calculation unit 51 and the position error Ls_g obtained by the position error calculation unit 52.

On the basis of the combined error Ls, the parameter calculation unit 54 calculates a parameter to be set for the CNN 33'. Specifically, with an algorithm designed to reduce the combined error Ls, the parameter calculation unit 54 calculates a parameter to be set for the CNN 33'.

The CNN 33' as a learner updates the parameter on the basis of the parameter calculated by the parameter calculation unit 54.

As described above, in the present example, a training in consideration of not only the inferred value error Ls_c but also the position error Ls_g is performed as the training of the CNN 33.

With this arrangement, in a case where image recognition is performed on a scene where a target object does not necessarily appear in an entire image frame, or the subject appears to be far or small, it is possible to improve recognition accuracy without performing object detection processing, unlike the object detection CNN.

Here, the combining unit 53 can also calculate a value obtained by weighting the inferred value error Ls_c and the position error Ls_g as the combined error Ls. For example, assuming that a weighting factor of the inferred value error Ls_c=$\alpha$ and a weighting factor of the position error Ls_g=$\beta$, a position error Ls is calculated as follows.

$$Ls=\alpha \cdot Ls\_c+\beta \cdot Ls\_g$$

With this arrangement, as learning tendency of the CNN 33, it is possible to adjust whether to perform training with emphasis on global error information as the inferred value error Ls_c, or to perform training with emphasis on error information for each region as the position error Ls_g, and thus, it is possible to improve a degree of freedom in setting learning tendency of the CNN.

A specific example of a processing procedure for achieving the learning technique as the first embodiment described above will be described with reference to the flowchart in FIG. 7.

Figure 7:
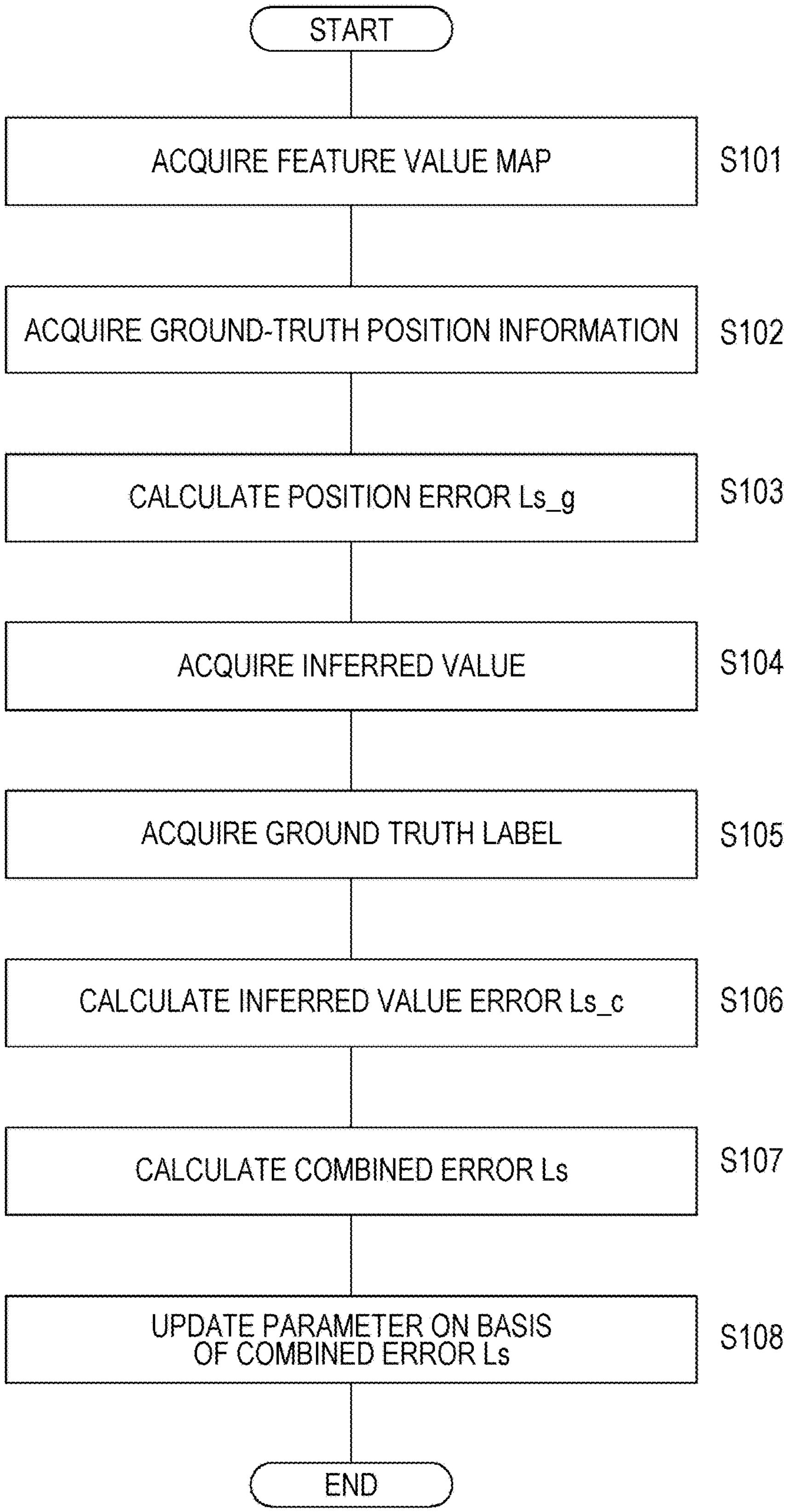
FIG. 7 is a flowchart illustrating a specific example of a processing procedure for achieving a learning technique as the first embodiment.

Note that the processing illustrated in FIG. 7 is executed by the CPU included in the learning apparatus 50. Here, the processing illustrated in FIG. 7 is repeatedly executed for each training image.

First, in Step S101, the learning apparatus 50 executes feature value map acquisition processing. That is, the feature value map acquisition processing is processing of acquiring the feature value map, which is obtained in the intermediate layer of the CNN 33', with respect to the input of the training image.

In Step S102 next to Step S101, the learning apparatus 50 acquires ground-truth position information. That is, processing of acquiring ground-truth position information corresponding to the input training image is executed.

Then, in Step S103 next to Step S102, the learning apparatus 50 executes calculation processing of the position error Ls_g. That is, there is calculated a position error Ls_g representing an error between the position of the target object indicated by the feature value map, the position being acquired in Step S101, and the position of the target object indicated by the ground-truth position information, the position being acquired in Step S102. Specifically, in the present example, a difference value between an overlapping degree and a feature index value for each grid between the feature value map and the ground-truth position information is calculated, and a total value of the difference values is calculated as the position error Ls_g.

In Step S104 next to Step S103, as processing of acquiring the inferred value, the learning apparatus 50 performs processing of acquiring the inferred value, which is obtained in the pooling unit 34, with respect to the input of the training image, and in next Step S105, the learning apparatus 50 performs processing of acquiring the ground truth label, that is, processing of acquiring information about the ground truth label corresponding to the input training image.

Then, in Step S106 next to Step S105, the learning apparatus 50 calculates an inferred value error Ls_c indicating an error between the acquired inferred value and the ground truth label. Specifically, a difference value between the inferred value and the ground truth label is calculated as the inferred value error Ls_c.

In Step S107 next to Step S106, the learning apparatus 50 performs calculation processing of the combined error Ls. That is, a combined error Ls obtained by combining the position error Ls_g calculated in Step S103 and the inferred value error Ls_c calculated in Step S106 is calculated.

Then, in Step S108 next to Step S107, the learning apparatus 50 performs parameter update processing on the basis of the combined error Ls. That is, parameter update for the CNN 33' is performed by the parameter calculated on the basis of the combined error Ls.

The learning apparatus 50 ends a series of processing illustrated in FIG. 7 in response to execution of the parameter update processing in Step S108.

Note that, in the processing in FIG. 7, processing in Steps S101 to S106 may be performed in any order. For example, each of the processing of acquiring the feature value map and the processing of acquiring the ground-truth position information, and the processing of acquiring the inferred value and the processing of acquiring the ground truth label may be performed in a reverse order of an exemplified order. Furthermore, the calculation of the position error Ls_g may be executed after the calculation of the inferred value error Ls_c.

Furthermore, here, as an example of the learning processing, there has been described processing on assumption that the ground-truth position information is included in all training data. However, in actual use, there may be a case where training data including the ground-truth position information and training data not including the ground-truth position information are mixed. In such a case, a technique according to the present technology using the ground-truth position information and a conventional technique not using the ground-truth position information may be combined. For example, it is conceivable to perform fine-tuning by using a learning technique in a case where a parameter of the CNN, which is trained by not using ground-truth position information but using only the inferred value error Ls_c, serves as an initial value, and the position error Ls_g is used in addition to the inferred value error Ls_c, or to perform learning in reverse order thereof, or the like.

2. Second Embodiment

Next, a second embodiment will be described.

In the second embodiment, a position of a target object is detected on the basis of a feature value map.

Note that, in the following description, parts similar to parts already described will be denoted by the same reference signs, and the description thereof will be omitted.

Figure 8:
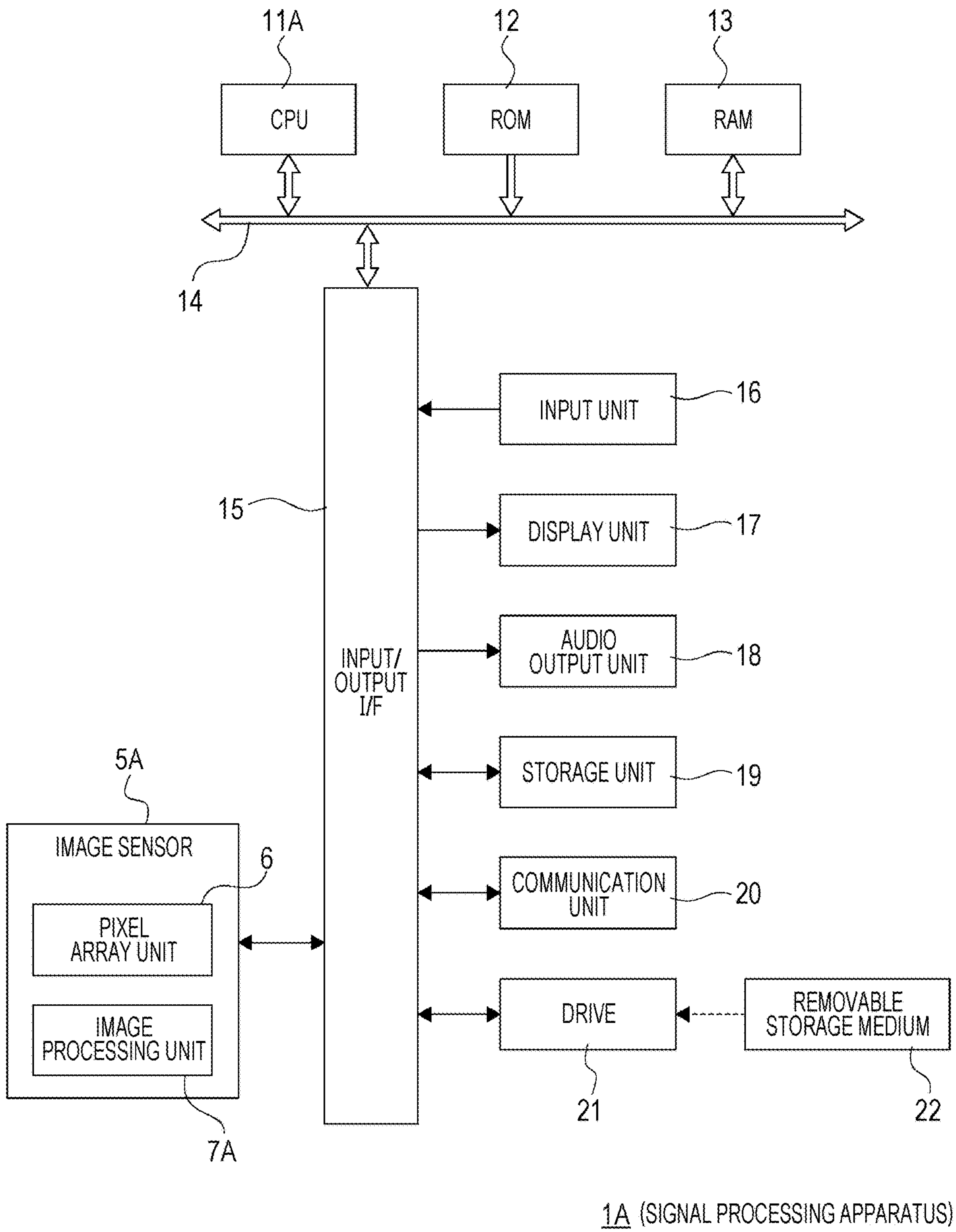
FIG. 8 is a block diagram illustrating a configuration example of a signal processing apparatus as a second embodiment.

FIG. 8 is a block diagram illustrating a configuration example of a signal processing apparatus 1A as the second embodiment.

The signal processing apparatus 1A is an embodiment of an imaging apparatus and signal processing apparatus according to the present technology.

The signal processing apparatus 1A is different from the signal processing apparatus 1 illustrated in FIG. 1 in that a CPU 11A is provided instead of the CPU 11, and an image sensor 5A is provided instead of the image sensor 5.

The image sensor 5A is different from the image sensor 5 in that an image processing unit 7A is provided instead of the image processing unit 7.

Figure 9:
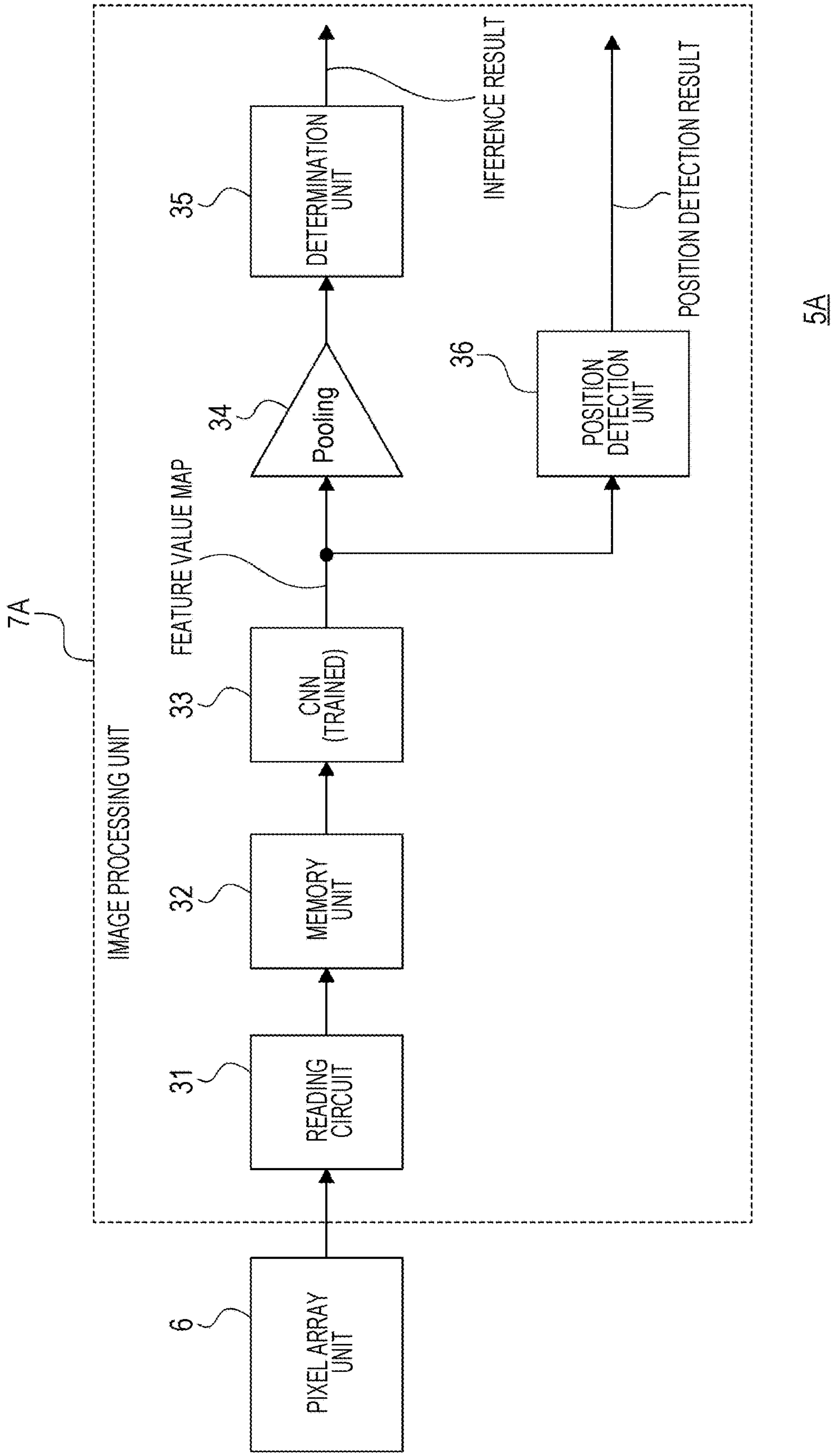
FIG. 9 is a block diagram for describing a configuration example of an image processing unit in the second embodiment.

FIG. 9 is a block diagram for describing a configuration example of the image processing unit 7A in the image sensor 5A, and also illustrates a pixel array unit 6 together with an internal configuration example of the image processing unit 7A.

The image processing unit 7A is different from the image processing unit 7 illustrated in FIG. 2 in that a position detection unit 36 is added.

The position detection unit 36 detects a position of the target object in an image on the basis of a feature value map obtained in an intermediate layer of a CNN 33.

FIG. 10 is an explanatory diagram of a position detection technique by the position detection unit 36.

FIG. 10A illustrates an example of a feature value map. Because the feature value map is information indicating a feature index value of the target object for each region in the image, the position of the target object can be easily detected on the basis of the feature index value for each region. Specifically, because it is highly possible that the target object is positioned in a region having a high feature index value, the position of the target object can be easily detected on the basis of the index value for each region.

Two specific position detection techniques can be exemplified.

A first technique is, as exemplified in FIG. 10B, a technique for binarizing the feature index value for each region in the feature value map. For example, a value such as "0.5" is set as a threshold value for the binarization, and then the feature index value is binarized to "0" or "1". A region having a feature index value binarized to "1" as a result is determined as a region in which the target object is recognized.

A second technique is, as exemplified in FIG. 10C, a technique for determining a boundary of an area in which the target object is recognized, on the basis of ratios of the feature index values among adjacent regions (grids) of the feature value map.

For example, a grid having a largest feature index value in the feature value map is determined as a core grid, and a boundary of the area in which the target object is recognized is determined according to ratios of a feature index value of the core grid to feature index values of grids adjacent to the core grid. For example, if the feature index value of the core grid is 0.8 and the feature index value of adjacent grids is 0.2, an area including only the core grid having the feature index value 0.8 and the adjacent grids having the feature index value 0.2 is determined to be the area in which the target object is recognized.

With this arrangement, the area in which the target object is detected is not limited to an area defined by a grid line, and more accurate position detection can be achieved.

Figure 11:
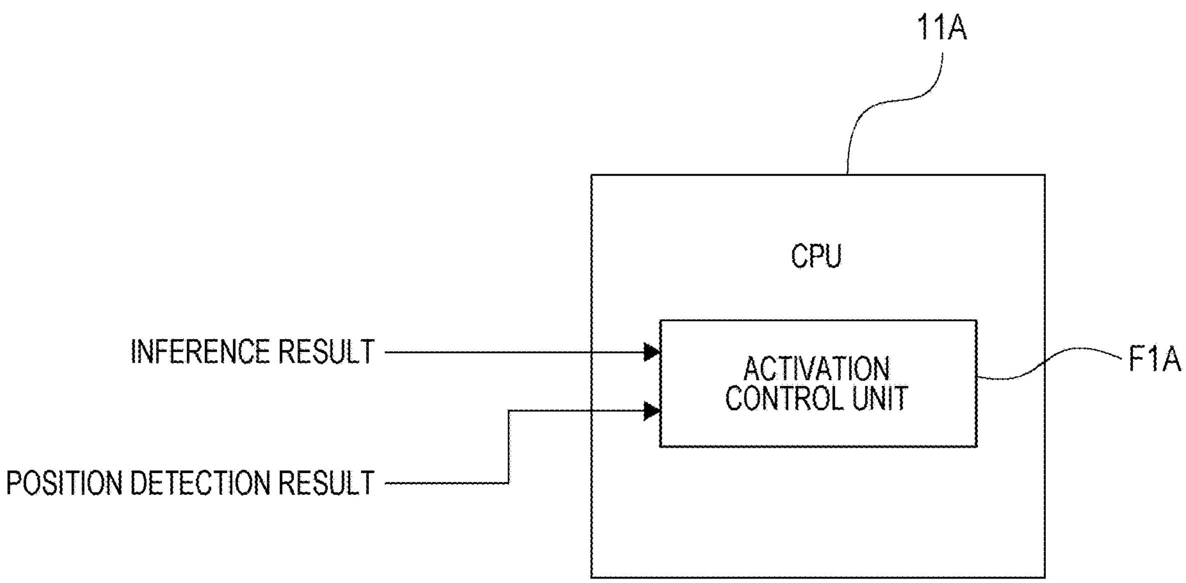
FIG. 11 is a functional block diagram for describing functions of the signal processing apparatus as the second embodiment.

FIG. 11 is a functional block diagram for describing functions that the CPU 11A illustrated in FIG. 8 has as the second embodiment.

As illustrated, the CPU 11A has functions as an activation control unit F1A.

On condition that the target object is recognized at a specific position in the image on the basis of a result of position detection by the position detection unit 36, the activation control unit F1A performs activation control of a predetermined unit. Specifically, the activation control unit F1A in the present example performs activation control of the predetermined unit, on condition that the target object is recognized at a predetermined position (for example, a predetermined area including a center of the image) in the image on the basis of a result of inference by a determination unit 35 illustrated in FIG. 9 and a result of position detection by a position detection unit 36 illustrated in FIG. 9. More specifically, the activation control unit F1A determines whether or not the inference result is "1" and the detected position of the target object indicated by a result of position detection by the position detection unit 36 corresponds to the predetermined position, and performs activation control of the predetermined unit in a case where an affirmative result is obtained, or does not perform the activation control in a case where a negative result is obtained.

In this case also, as the activation control, it is conceivable to perform activation control from a sleep state as described above (for example, activation control of the display unit 17, or the like).

By the activation control unit F1A performing the processing described above, in addition to the target object appearing, it is possible to achieve the activation control of the predetermined unit, including a position where the target object appears as a condition.

Therefore, activation control can be appropriately performed in response to a case where not only appearance of a target object but also a position where the target object appears is required as an activation condition of the predetermined unit.

3. Third Embodiment

In a third embodiment, scene estimation is performed on the basis of a result of detecting a position of a target object based on a feature value map.

The scene described here is a scene related to a state of a target object, and examples thereof include a scene where a human as the target object is walking, a scene where a dog as the target object is running, and the like.

Hereinafter, an example will be described in which position detection is performed for each of target objects of different types, and scene estimation is performed on the basis of a result of detecting a position of each type.

Figure 12:
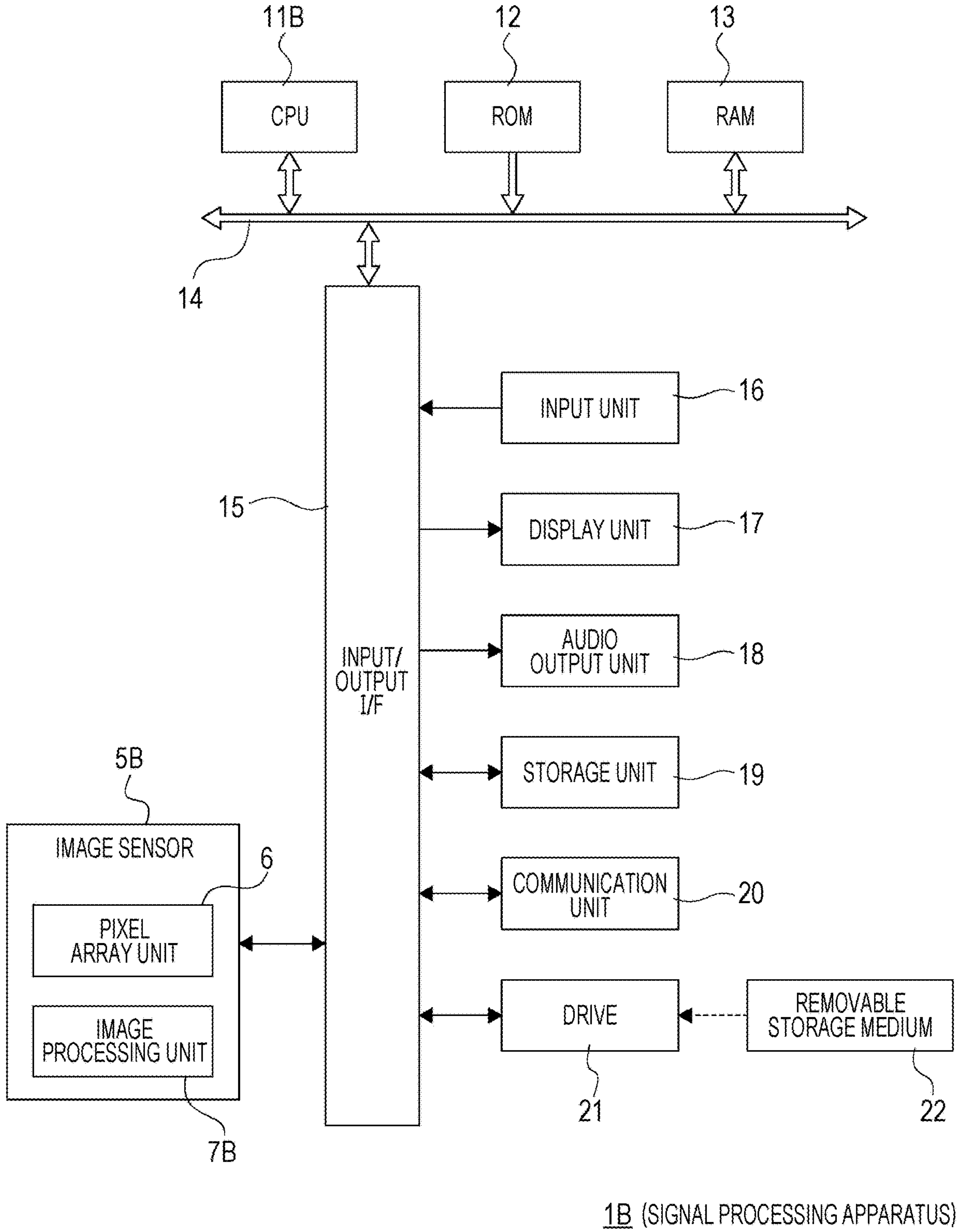
FIG. 12 is a block diagram illustrating a configuration example of a signal processing apparatus as a third embodiment.

FIG. 12 is a block diagram illustrating a configuration example of a signal processing apparatus 1B as the third embodiment. The signal processing apparatus 1B is an embodiment of an imaging apparatus and signal processing apparatus according to the present technology.

The signal processing apparatus 1B is different from the signal processing apparatus 1 illustrated in FIG. 1 in that a CPU 11B is provided instead of the CPU 11, and an image sensor 5B is provided instead of the image sensor 5.

The image sensor 5B is different from the image sensor 5 in that an image processing unit 7B is provided instead of the image processing unit 7.

Figure 13:
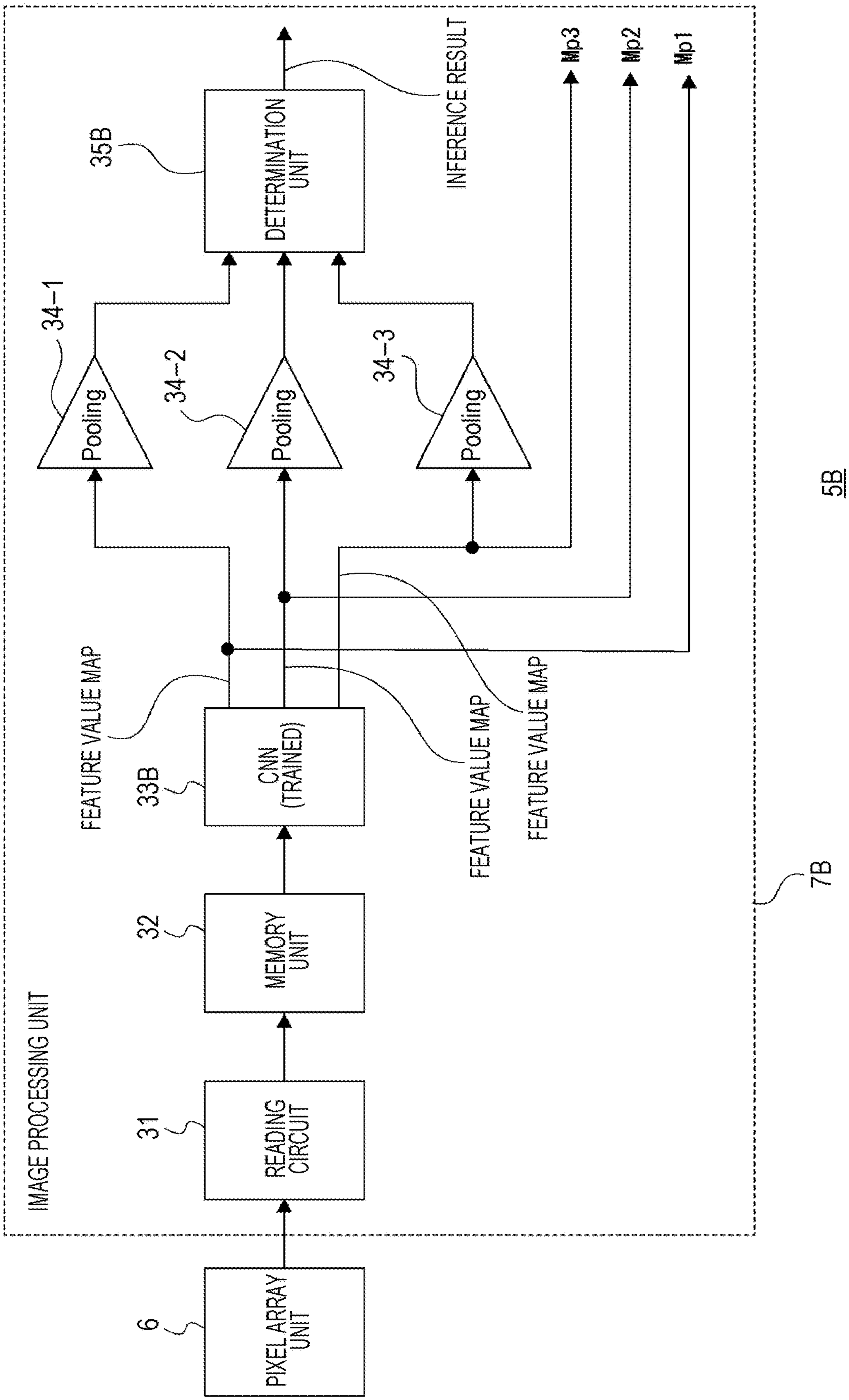
FIG. 13 is a block diagram for describing a configuration example of an image processing unit in the third embodiment.

FIG. 13 is a block diagram for describing a configuration example of the image processing unit 7B in the image sensor 5B, and also illustrates a pixel array unit 6 together with an internal configuration example of the image processing unit 7B.

The image processing unit 7B is different from the image processing unit 7 illustrated in FIG. 2 in that a CNN 33B is provided instead of the CNN 33, a plurality of pooling units 34 is provided, and a determination unit is provided instead of the determination unit 35.

The CNN 33B is trained to perform processing on a plurality of target objects of different types (classes) as processing for recognizing the target objects.

Specifically, in the present example, the CNN 33B is trained to perform processing for recognizing "human", "dog", and "sofa" as the target objects. Note that the types of the target objects described here are merely examples, and learning may be performed so as to perform processing for recognizing target objects of other types.

The CNN 33B performs, on an input image, convolution operations using kernels different for each type of target object, thereby generating a feature value map for each type. That is, in a case of the present example, a convolution operation using a kernel for recognizing "human", a convolution operation using a kernel for recognizing "dog", and a convolution operation using a kernel for recognizing "sofa" are executed on the input image, and feature value maps for each of "human", "dog", and "sofa" are generated.

In this case, the pooling units 34 of the same number as the types of the target objects are provided in order to perform max pooling processing for each of the feature value maps generated in this manner for each of the target objects. Here, because the number of types is three, three pooling units 34-1, 34-2, and 34-3 are provided as the pooling unit 34.

The determination unit 35B obtains an inference result for each type on the basis of an inferred value obtained by each pooling unit 34 performing the max pooling processing on a corresponding feature value map, that is, on the basis of an inferred value obtained for each type of target object.

Specifically, by performing threshold value determination similar to threshold value determination by the determination unit 35 described above for the inferred values of "human", "dog", and "sofa", a determination result as to whether or not the target object has been recognized in the input image is obtained for each type of "human", "dog", and "sofa".

Here, in the present example, the number of types of target objects is three, and three types of feature value maps are obtained. In a case where these three types of feature value maps are distinguished, "Mp1", "Mp2", and "Mp3" are added as reference signs.

Figure 14:
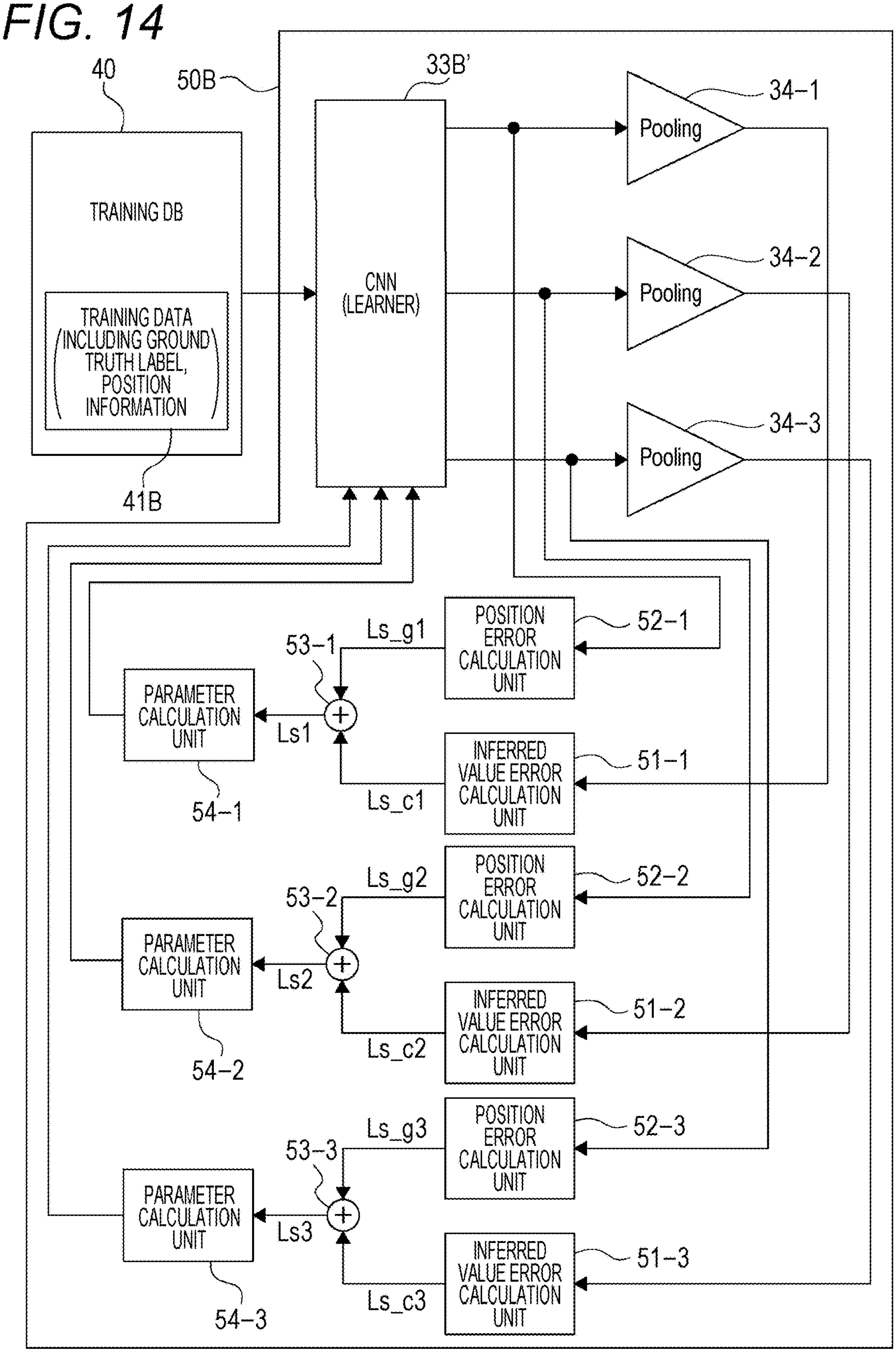
FIG. 14 is an explanatory diagram of a system configuration for learning according to the third embodiment.

FIG. 14 is an explanatory diagram of a system configuration for learning according to the third embodiment.

In learning in this case, training data 41B is stored in the training DB 40 in advance, and a learning apparatus 50B is used.

In this case, the training DB 40 stores, as training images, training images for each type of target object (sets of an image including the target object and an image not including the target object). As the training data 41B, information about ground truth label and ground-truth position information are prepared for each of the training images.

The learning apparatus 50B includes a CNN 33B' as a learner of the CNN 33B, and, for each type of target object, includes a set of a pooling unit 34, an inferred value error calculation unit 51, a position error calculation unit 52, a combining unit 53, and a parameter calculation unit 54 that are described above with reference to FIG. 4. In the drawing, a set of the pooling unit 34, the inferred value error calculation unit 51, the position error calculation unit 52, the combining unit 53, and the parameter calculation unit 54, is denoted by a numerical value of "-" (hyphen) and any one of "1" to "3" added to an end of a reference sign in order to represent a different set corresponding to each type.

Here, the pooling unit 34-1 obtains an inferred value regarding a feature value map obtained by the CNN 33B' performing processing for recognizing a first-type target object (for example, "human"). An inferred value error calculation unit 51-1 calculates, as an inferred value error Ls_c1, an error between the inferred value obtained by the pooling unit 34-1 and a ground truth label for the first type among ground truth labels for each type, the ground truth labels corresponding to an input training image.

Furthermore, a position error calculation unit 52-1 calculates, as a position error Ls_g1, an error between a feature value map obtained by the CNN 33B' performing processing for recognizing the first-type target object, and ground-truth position information about the first type among ground-truth position information for each type, the ground-truth position information corresponding to the input training image.

The combining unit 53-1 combines the inferred value error Ls_c1 and the position error Ls_g1 to obtain a combined error Ls1.

A parameter calculation unit 54-1 calculates, on the basis of the combined error Ls1, a parameter used by the CNN 33B' in the processing for recognizing the first-type target object.

Furthermore, the pooling unit 34-2 obtains an inferred value for a feature value map obtained by the CNN 33B' performing processing for recognizing a second-type target object (for example, "dog"), and an inferred value error calculation unit 51-2 calculates, as an inferred value error Ls_c2, an error between the inferred value obtained by the pooling unit 34-2, and a ground truth label for the second type among the ground truth labels for each type, the ground truth labels corresponding to the input training image. Furthermore, a position error calculation unit 52-2 calculates, as a position error Ls_g2, an error between a feature value map obtained by the CNN 33B' performing processing for recognizing the second-type target object, and ground-truth position information about the second type among the ground-truth position information for each type, the ground-truth position information corresponding to the input training image.

A combining unit 53-2 combines the inferred value error Ls_c2 and the position error Ls_g2 to obtain a combined error Ls2, and a parameter calculation unit 54-2 calculates, on the basis of the combined error Ls2, a parameter used by the CNN 33B' in the processing for recognizing the second-type target object.

Furthermore, the pooling unit 34-3 obtains an inferred value for a feature value map obtained by the CNN 33B' performing processing for recognizing a third-type target object (for example, "sofa"), and an inferred value error calculation unit 51-3 calculates, as an inferred value error Ls_c3, an error between the inferred value obtained by the pooling unit 34-3, and a ground truth label for the third type among the ground truth labels for each type, the ground truth labels corresponding to the input training image. Furthermore, a position error calculation unit 52-3 calculates, as a position error Ls_g3, an error between a feature value map obtained by the CNN 33B' performing processing for recognizing the third-type target object, and ground-truth position information about the third type among the ground-truth position information for each type, the ground-truth position information corresponding to the input training image.

A combining unit 53-3 combines the inferred value error Ls_c3 and the position error Ls_g3 to obtain a combined error Ls3, and a parameter calculation unit 54-3 calculates, on the basis of the combined error Ls3, a parameter used by the CNN 33B' in the processing for recognizing the third-type target object.

With the parameters calculated by the parameter calculation units 54-1, 54-2, and 54-3, the CNN 33B' updates the parameter used in the processing for recognizing the first-type target object, the parameter used in the processing for recognizing the second-type target object, and the parameter used in the processing for recognizing the third-type target object, respectively.

With a learning system as described above, a recognition algorithm in the CNN 33B illustrated in FIG. 13 (an algorithm in a recognizer capable of recognizing a plurality of types of target objects) can be obtained.

Figure 15:
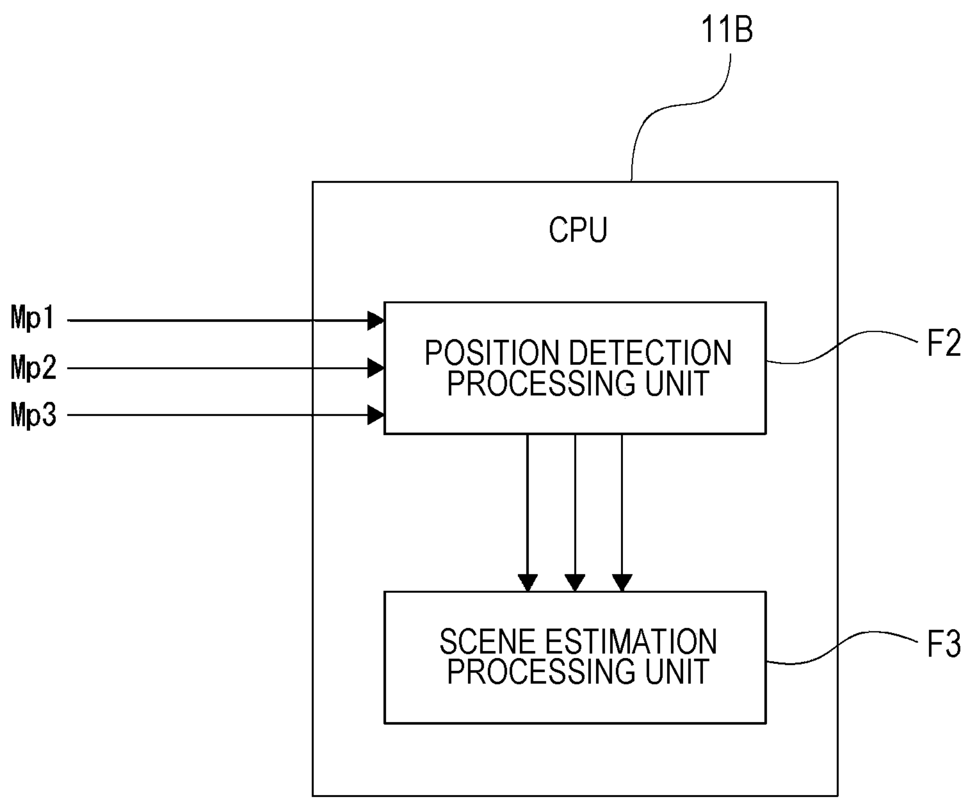
FIG. 15 is a functional block diagram for describing functions of the signal processing apparatus as the second embodiment.

FIG. 15 is a functional block diagram for describing functions that the CPU 11B illustrated in FIG. 12 has as the third embodiment.

As illustrated, the CPU 11B has functions as a position detection processing unit F2 and a scene estimation processing unit F3.

The position detection processing unit F2 detects a position of a target object in an image on the basis of a feature value map obtained in an intermediate layer of the CNN 33B. Specifically, the position detection processing unit F2 of the present example detects a position of a target object in the image for each type on the basis of each of the feature value maps Mp1, Mp2, and Mp3 obtained in the CNN 33B for the respective types of target objects.

Note that, in this case as well, either the first technique or second technique described above can be adopted as a technique for detecting a position of a target object based on a feature value map.

Here, although position detection based on a feature value map is performed by the position detection unit 36 in the image processing unit 7A in the image sensor 5A in the above-described second embodiment (refer to FIG. 9), the position detection can also be performed outside an image sensor as in the present example.

The scene estimation processing unit F3 performs scene estimation on the basis of a change aspect of a position of a target object detected by the position detection processing unit F2. Specifically, the scene estimation processing unit F3 in the present example performs scene estimation on the basis of a change aspect of a detected position for each of the target objects of different types.

Figure 16:
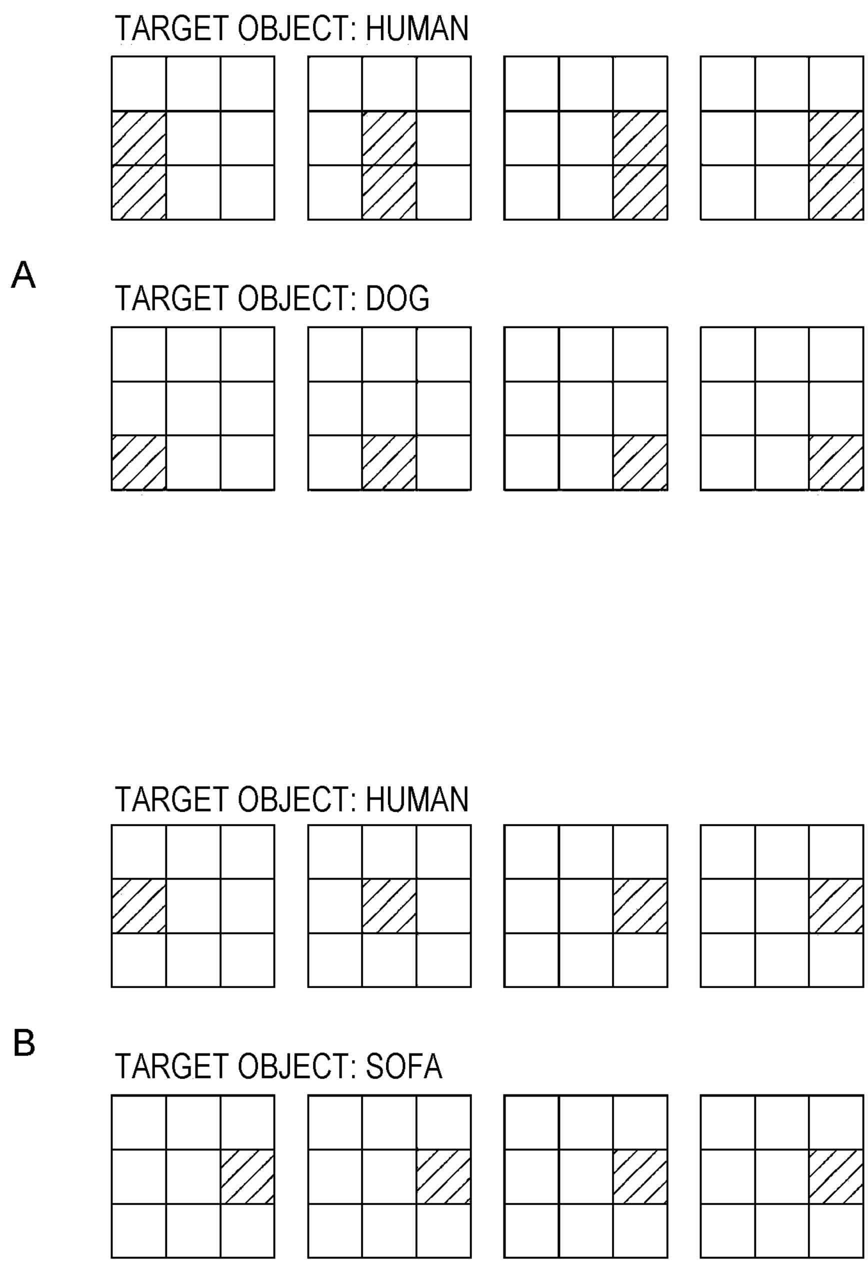
FIG. 16 is an explanatory diagram of an example of scene estimation.

FIG. 16 is an explanatory diagram of an example of scene estimation.

FIG. 16A exemplifies a transition of a detected position of the target object as "human" and a transition of a detected position of the target object as "dog" within a certain period. Specifically, in the present example, the detected position of "human" in the image coincides with the detected position of "dog", in the image in a plurality of consecutive frames. From such a position transition for each target object, the scene can be estimated to be a scene where a human and a dog are walking together (the dog is being taken for a walk).

FIG. 16B exemplifies a transition of a detected position of the target object as "human" and a transition of a detected position of the target object as "sofa" within a certain period. Specifically, in the present example, while a detected position of "sofa" in the image is fixed, a detected position of "human" in the image approaches a position of "sofa" with time, and then a state where the detected position of "human" coincides with the position of "sofa" continues over a plurality of consecutive frames.

From such a position transition for each target object, the scene can be estimated to be a scene where a human approaches and sits on a sofa.

In this manner, the scene estimation processing unit F3 performs scene estimation on the basis of a change aspect of a detected position for each of the target objects of different types. Specifically, whether or not the scene corresponds to a specific scene is estimated on the basis of whether or not a change aspect of a detected position of each target object within a predetermined period coincides with a predetermined change aspect. For example, the scene estimation in FIG. 16A is performed by determining whether or not a rule that the detected position of "human" in the image coincides with the detected position of "dog" in the image in a plurality of predetermined number of consecutive frames is satisfied. Furthermore, for example, the scene estimation in FIG. 16B is performed by determining whether or not a rule that the detected position of "sofa" in the image is fixed for a predetermined period, and, within the predetermined period, the detected position of "human" in the image approaches the position of "sofa", and then a state where the detected position of "human" coincides with the position of "sofa" continues over a plurality of consecutive frames is satisfied.

Thus, in this manner, on the basis of a change aspect of a detected position for each of the target objects, the scene estimation processing unit F3 performs, with rule-based estimation processing, scene estimation as to whether or not the scene corresponds a specific scene.

Figure 17:
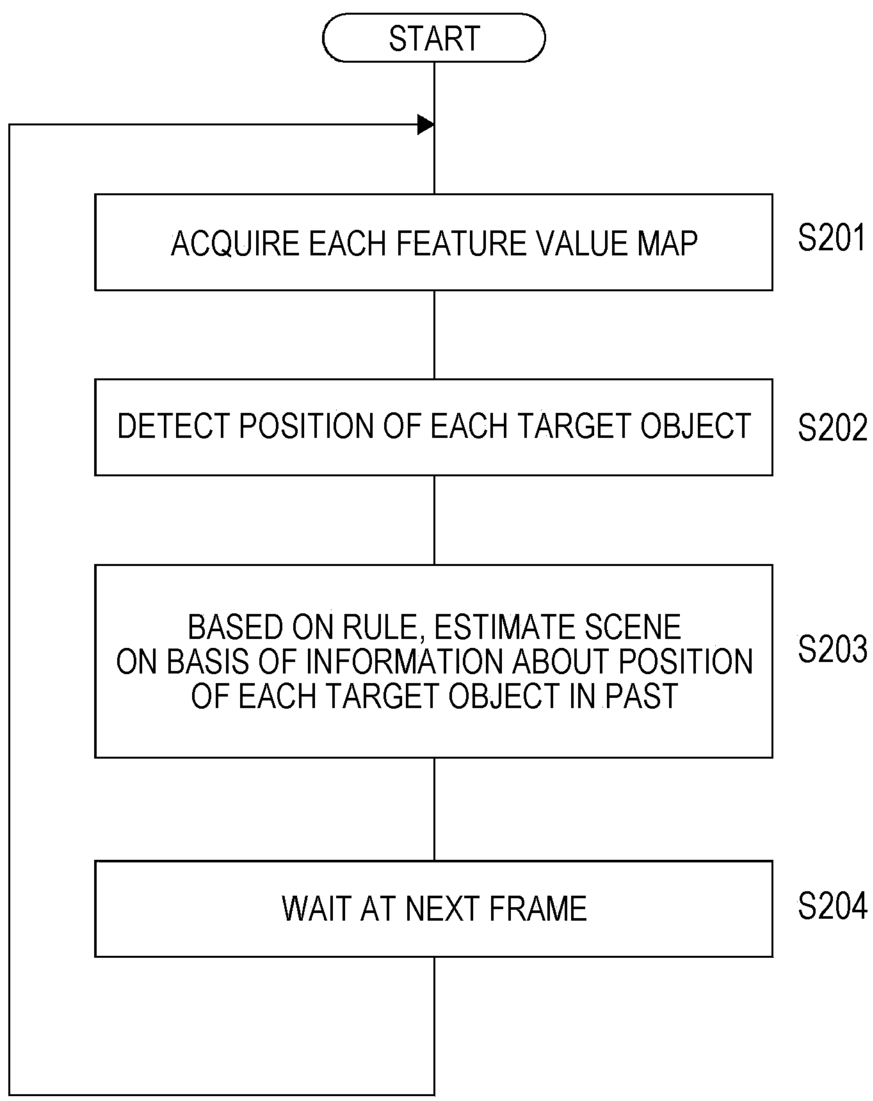
FIG. 17 is a flowchart illustrating an example of a processing procedure for achieving functions as a third embodiment.

FIG. 17 is a flowchart illustrating an example of a processing procedure for achieving functions of the CPU 11B as the third embodiment described above.

First, in Step S201, the CPU 11B acquires each feature value map. That is, feature value maps for each of the target objects of different types are acquired from the CNN 33B. Then, in Step S202 next to Step S201, the CPU 11B detects a position of each target object. This is processing corresponding to the position detection processing unit F2 described above, and is processing of detecting the position of each target object in the image on the basis of each feature value map acquired in Step S201.

In Step S203 next to Step S202, based on a rule, the CPU 11B estimates a scene on the basis of information about the position of each target object in past. Note that, because examples of scene estimation have already been described, repeated description thereof is omitted.

In Step S204 next to Step S203, the CPU 11B performs processing of waiting by one frame, and then the processing returns to Step S201.

4. Modifications

Here, the embodiments are not limited to the specific examples described above, and may be configured as various modifications.

For example, the signal processing apparatus 1B as the third embodiment can be configured to have functions as the activation control unit F1 described in the first embodiment or functions as the activation control unit F1A described in the second embodiment.

Furthermore, in the above description, an example has been described in which a CNN that performs processing for image recognition is provided in an image sensor, but the CNN may be provided outside the image sensor.

Furthermore, in the above description, an example has been described in which scene estimation is performed on the basis of information about a position of a target object detected on the basis of a feature value map, but the information about the position of the detected target object can also be used as information for control of various kinds of camera. For example, it is conceivable to set a photometry area of auto exposure (AE) with reference to a detected position of a target object, set a detected position of a target object as a target position of auto focus (AF), or the like.

Furthermore, information about a position of a target object detected on the basis of a feature value map can also be used as information indicating motion of the target object. For example, it is conceivable that designation of a target object to be a target can be received from a user, and in a case where the target object is designated, information about a detected position of the designated target object, that is, for example, information about history of a change in position from a designated timing, is presented to the user.

5. Conclusion of Embodiments

As described above, learning apparatuses (learning apparatuses 50 and 50B) according to the embodiments include a learning unit (an inferred value error calculation unit 51, a position error calculation unit 52, a combining unit 53, and a parameter calculation unit 54) that trains a convolutional neural network (CNN) by using, as training data, a ground truth label prepared for each training image and ground-truth position information indicating a position of a target object in a training image.

With this arrangement, as training of the CNN for image recognition, it possible to perform training in consideration of the position of the target object in an image.

Therefore, in a case where image recognition is performed on a scene where a target object does not necessarily appear in an entire image frame, it is possible to improve recognition accuracy without performing object detection processing, unlike the object detection CNN. That is, it is possible to improve object recognition accuracy while preventing an increase in the number of computational resources for an image recognizer using a CNN.

Furthermore, in the learning apparatuses according to the embodiments, the learning unit performs parameter update for the CNN on the basis of an inferred value error that is an error between an inferred value of the CNN with respect to the training image and the ground truth label, and a position error that is an error between a position of a target object in the training image, the position being indicated by a feature value map obtained in an intermediate layer of the CNN, and a position indicated by ground-truth position information (refer to FIG. 7 or the like).

With this arrangement, the parameter update of the CNN at a time of learning is performed on the basis of the error between the position of the target object indicated by the feature value map and the ground-truth position.

Therefore, in a case where image recognition is performed on a scene where a target object does not necessarily appear in an entire image frame, it is possible to improve recognition accuracy without performing object detection processing, unlike the object detection CNN.

Moreover, in the learning apparatuses according to the embodiments, the learning unit performs the parameter update on the basis of a combined error obtained by combining the inferred value error and the position error (refer to FIG. 7 or the like).

With this arrangement, when achieving a parameter update of the CNN based on the position error, it is not necessary to separately execute a (normal) parameter update based on the inferred value error and the parameter update based on the position error.

Therefore, it is possible to improve efficiency of CNN parameter update processing at a time of learning.

Moreover, in the learning apparatuses according to the embodiments, the learning unit performs the parameter update by using, as the combined error, a value obtained by weighting the inferred value error and the position error.

With this arrangement, as learning tendency of the CNN, it is possible to adjust whether to perform training with emphasis on global error information as the inferred value error, or to perform training with emphasis on error information for each region as the position error.

Therefore, it is possible to improve a degree of freedom in setting learning tendency of the CNN.

Furthermore, in the learning apparatuses according to the embodiments, the learning unit performs the training using, as training data, the ground truth label and the ground-truth position information for each of target objects of different types (refer to FIG. 14 or the like).

With this arrangement, on a CNN that obtains an inference result for each of objects of different types such as a human, a dog, and a sofa for example, it is possible to perform training in consideration of the position of the target object in an image.

Therefore, it is possible to improve object recognition accuracy while preventing an increase in the number of computational resources for a CNN image recognizer capable of recognizing a plurality of objects of different types.

A learning method according to the embodiments includes, by an information processing apparatus, training a convolutional neural network (CNN) by using, as training data, a ground truth label prepared for each training image and ground-truth position information indicating a position of a target object in the training image.

With such a learning method, it is possible to obtain functions and effects similar to functions and effects of the learning apparatuses as the above-described embodiments.

Imaging apparatuses (signal processing apparatuses 1, 1A, and 1B) according to the embodiments include a pixel array unit (a pixel array unit 6) in which a plurality of pixels including a photoelectric conversion element is arranged, and an image sensor (the image sensor 5, 5A, or 5B) including a convolutional neural network (CNN) trained by using, as training data, a ground truth label prepared for each training image and ground-truth position information indicating a position of a target object in the training image, and including a signal processing unit (the image processing unit 7, 7A, or 7B) that performs processing for image recognition on a captured image obtained by photoelectric conversion in the pixel array unit.

With this arrangement, in a case where a signal processing unit implemented in the image sensor and having less computational resources performs processing of image recognition with the CNN, it is possible to appropriately perform image recognition of a scene where a target object does not necessarily appear in an entire image frame is a target, without performing object detection processing as in a case of the object detection CNN.

Therefore, it is possible to improve practicality of an image recognition CNN implemented in the image sensor.

Furthermore, the imaging apparatuses (signal processing apparatuses 1 and 1A) according to the embodiments further include a control unit (an activation control unit F1 or F1A) that performs activation control of a predetermined unit in an own-apparatus on condition that a target object is recognized in the captured image by processing of image recognition using the CNN.

With this arrangement, it is possible to accurately perform, on the basis of a highly accurate image recognition result, control of activating the predetermined unit of the own-apparatus on condition that the target object is recognized, such as shifting a state of the own-apparatus from a sleep state to an activation state in response to the recognition of the target object in the captured image.

Therefore, it is possible to improve reliability of activation control of a predetermined unit based on the image recognition result.

Imaging apparatuses (signal processing apparatuses (1A, and 1B) according to the embodiments include a position detection unit (a position detection unit 36 or a position detection processing unit F2) that detects a position of a target object in an image on the basis of a feature value map obtained in an intermediate layer of a convolutional neural network (CNN).

Because the feature value map can be paraphrased as information indicating an index value of a feature value (feature index value) of target object for each region in the image, the position of the target object can be easily detected on the basis of the feature index value for each region. Specifically, because it is highly possible that the target object is positioned in a region having a high feature index value, the position of the target object can be easily detected on the basis of the index value for each region.

Therefore, it is possible to detect the position of the target object with less computational resources than in a case where object detection processing, such as an object detection CNN, is performed.

Furthermore, in the signal processing apparatuses according to the embodiments, the position detection unit detects a position of the target object on the basis of a magnitude of a feature index value for each region in the feature value map.

In the feature value map, there is a high possibility that the target object is positioned in a region having a large feature index value.

Therefore, with the above-described configuration, it is possible to appropriately detect the position of the target object.

Moreover, in the signal processing apparatuses according to the embodiments, the position detection unit detects, as the position of the target object, a position in which the feature index value is equal to or more than a threshold value.

With this arrangement, position detection of the target object is achieved by simple processing of threshold value determination on the feature index value.

Therefore, it is possible to reduce the number of computational resources related to position detection.

Moreover, in the signal processing apparatus (a signal processing apparatus 1B) according to an embodiment, the position detection unit (a position detection processing unit F2) detects, on the basis of the feature value map generated by the CNN for each of target objects of different types, a position of each the target objects in an image.

With this arrangement, for example, position detection for each of objects of different types, such as a human, a dog, and a sofa, is performed on the basis of a feature value map for each object.

Therefore, it is possible to reduce processing load related to position detection for each object.

Furthermore, the signal processing apparatuses according to the embodiments further include a scene estimation unit (a scene estimation processing unit F3) that performs scene estimation on the basis of a change aspect of a position of the target object detected by the position detection unit.

The scene described here is a scene related to a state of a target object, and examples thereof include a scene where a human as the target object is walking, a scene where a dog as the target object is running, and the like.

With the above-described configuration, position detection processing on the target object, the processing being required for such scene estimation, is achieved with less computational resources, and thus the number of computational resources related to scene estimation can be reduced.

Moreover, in the signal processing apparatuses according to the embodiments, the position detection unit detects, on the basis of the feature value map generated by the CNN for each of target objects of different types, a position of each the target object in an image, and the scene estimation unit performs scene estimation on the basis of a change aspect of a detected position for each the target object (refer to FIG. 17 or the like).

Examples of the scene estimation based on the change aspect of the detected position for each target object include estimation of, for example, a scene where a human and a dog are walking together (the dog is being taken for a walk), a scene where a human approaches and sits on a sofa, and the like.

With the above-described configuration, position detection processing on a plurality of target objects, the processing being required for such scene estimation, is achieved with less computational resources, and thus the number of computational resources related to scene estimation can be reduced.

Moreover, a signal processing apparatus (a signal processing apparatus LA) according to an embodiment further includes a control unit (an activation control unit F1A) that performs, on condition that the target object is recognized at a specific position in an image on the basis of a result of position detection by the position detection unit, activation control of a predetermined unit.

With this arrangement, in addition to the target object appearing, it is possible to achieve the activation control of the predetermined unit, including a position where the target object appears as a condition.

Therefore, activation control can be appropriately performed in response to a case where not only appearance of a target object but also a position where the target object appears is required as an activation condition of the predetermined unit.

A signal processing method according to the embodiments is a signal processing method in which a signal processing apparatus detects a position of a target object in an image on the basis of a feature value map obtained in an intermediate layer of a convolutional neural network (CNN).

With such a signal processing method, it is possible to obtain functions and effects similar to functions and effects of the signal processing apparatuses as the above-described embodiments.

Note that the effects described herein are only examples, and the effects of the present technology are not limited to these effects. Additional effects may also be obtained.

6. Present Technology

Note that the present technology can have the following configurations.

(1)

A learning apparatus including a learning unit that trains a convolutional neural network (CNN) by using, as training data, a ground truth label prepared for each training image and ground-truth position information indicating a position of a target object in the training image.

(2)

The learning apparatus according to (1), in which the learning unit performs parameter update for the CNN on the basis of an inferred value error that is an error between an inferred value of the CNN with respect to the training image and the ground truth label, and a position error that is an error between a position of a target object in the training image, the position being indicated by a feature value map obtained in an intermediate layer of the CNN, and a position indicated by the ground-truth position information.

(3)

The learning apparatus according to (2), in which the learning unit performs the parameter update on the basis of a combined error obtained by combining the inferred value error and the position error.

(4)

The learning apparatus according to (3), in which the learning unit performs the parameter update by using, as the combined error, a value obtained by weighting the inferred value error and the position error.

(5)

The learning apparatus according to any one of (1) to (4), in which the learning unit performs the training using, as training data, the ground truth label and the ground-truth position information for each of target objects of different types.

(6)

A learning method including, by an information processing apparatus, training a convolutional neural network (CNN) by using, as training data, a ground truth label prepared for each training image and ground-truth position information indicating a position of a target object in the training image.

(7)

An imaging apparatus including a pixel array unit in which a plurality of pixels including a photoelectric conversion element is arranged, and an image sensor including a convolutional neural network (CNN) trained by using, as training data, a ground truth label prepared for each training image and ground-truth position information indicating a position of a target object in the training image, and including a signal processing unit that performs processing for image recognition on a captured image obtained by photoelectric conversion in the pixel array unit.

(8)

The imaging apparatus according to (7), further including a control unit that performs activation control of a predetermined unit in an own-apparatus on condition that a target object is recognized in the captured image by processing of image recognition using the CNN.

(9)

A signal processing apparatus including a position detection unit that detects a position of a target object in an image on the basis of a feature value map obtained in an intermediate layer of a convolutional neural network (CNN).

(10)

The signal processing apparatus according to (9), in which the position detection unit detects a position of the target object on the basis of a magnitude of a feature index value for each region in the feature value map.

(11)

The signal processing apparatus according to (10), in which the position detection unit detects, as the position of the target object, a position in which the feature index value is equal to or more than a threshold value.

(12)

The signal processing apparatus according to any one of (9) to (11), in which the position detection unit detects, on the basis of the feature value map generated by the CNN for each of target objects of different types, a position of each the target objects in an image.

(13)

The signal processing apparatus according to any one of (9) to (12), further including a scene estimation unit that performs scene estimation on the basis of a change aspect of a position of the target object detected by the position detection unit.

(14)

The signal processing apparatus according to (13), in which the position detection unit detects, on the basis of the feature value map generated by the CNN for each of target objects of different types, a position of each the target object in an image, and the scene estimation unit performs scene estimation on the basis of a change aspect of a detected position for each the target object.

(15)

The signal processing apparatus according to any one of (9 to (14), further including a control unit that performs, on condition that the target object is recognized at a specific position in an image on the basis of a result of position detection by the position detection unit, activation control of a predetermined unit.

(16)

A signal processing method in which a signal processing apparatus detects a position of a target object in an image on the basis of a feature value map obtained in an intermediate layer of a convolutional neural network (CNN).

REFERENCE SIGNS LIST

1, 1A, 1B Signal processing apparatus
5A, 5B Image sensor
6 Pixel array unit
7, 7A, 7B Image processing unit
11, 11A, 11B CPU
17 Display unit
31 Reading circuit
32 Memory unit
33, 33B CNN (trained)
33'33B' CNN (learner)
34 Pooling unit
35B Determination unit
36 Position detection unit
40 Training DB (database)
41, 41B Training data
50B Learning apparatus
51, 51-1, 51-2, 51-3 Inferred value error calculation unit
52, 52-1, 52-2, 52-3 Position error calculation unit
53, 53-1, 53-2, 53-3 Combining unit
54, 54-1, 54-2, 54-3 Parameter calculation unit
F1, F1A Activation control unit
F2 Position detection processing unit
F3 Scene estimation processing unit
Ls_g Position error
Ls_c Inferred value error
Ls Combined error
Mp1, Mp2, Mp3 Feature value map

The invention claimed is:

1. A learning apparatus, comprising:

circuitry configured to:

train a convolutional neural network (CNN) by using, as training data, a ground truth label prepared for each training image and ground-truth position information indicating a position of a target object in the training image, wherein the ground-truth position information is determined based on dividing each training image into a grid and determining a percentage overlap of the target object for each section of the grid, and the training data includes a first set of training images for which the ground-truth position information is prepared and a second set of training images for which the ground-truth position information is not prepared;

calculate, for a training image included in the first set of training images, a position error between the ground-truth position information and a position of the target object in the training image indicated by a feature value map from an intermediate layer of the CNN;

update parameters of the CNN based on a combined error obtained by combining the position error and an inferred value error, the inferred value error being an error between an inferred value of the CNN with respect to the training image and the ground truth label; and detect a position of the target object in an image based on the feature value map by determining a core grid having a largest feature index value and determining a boundary of an area based on ratios of the feature index value of the core grid to feature index values of grids adjacent to the core grid.

2. The learning apparatus according to claim 1, wherein the circuitry performs the parameter update by using, as the combined error, a value obtained by weighting the inferred value error and the position error.

3. The learning apparatus according to claim 1, wherein the circuitry trains the CNN using, as the training data, the ground truth label and the ground-truth position information for each of target objects of different types.

4. A learning method, comprising:

training, by circuitry of an information processing apparatus, a convolutional neural network (CNN) by using, as training data, a ground truth label prepared for each training image and ground-truth position information indicating a position of a target object in the training image, wherein the ground-truth position information is determined based on dividing each training image into a grid and determining a percentage overlap of the target object for each section of the grid, and the training data includes a first set of training images for which the ground-truth position information is prepared and a second set of training images for which the ground-truth position information is not prepared;

calculating, for a training image included in the first set of training images, a position error between the ground-truth position information and a position of the target object in the training image indicated by a feature value map from an intermediate layer of the CNN;

updating parameters of the CNN based on a combined error obtained by combining the position error and an inferred value error, the inferred value error being an error between an inferred value of the CNN with respect to the training image and the ground truth label; and detecting a position of the target object in an image based on the feature value map by determining a core grid having a largest feature index value and determining a boundary of an area based on ratios of the feature index value of the core grid to feature index values of grids adjacent to the core grid.

5. An imaging apparatus, comprising:

a pixel array in which a plurality of pixels including a photoelectric conversion element is arranged; and an image sensor including circuitry configured to:

train a convolutional neural network (CNN) trained by using, as training data, a ground truth label prepared for each training image and ground-truth position information indicating a position of a target object in the training image, and including a signal processing unit that performs processing for image recognition on a captured image obtained by photoelectric conversion in the pixel array, wherein the ground-truth position information is determined based on dividing each training image into a grid and determining a percentage overlap of the target object for each section of the grid, and the training data includes a first set of training images for which the ground-truth position information is prepared and a second set of training images for which the ground-truth position information is not prepared;

calculate, for a training image included in the first set of training images, a position error between the ground-truth position information and a position of the target object in the training image indicated by a feature value map from an intermediate layer of the CNN;

update parameters of the CNN based on a combined error obtained by combining the position error and an inferred value error, the inferred value error being an error between an inferred value of the CNN with respect to the training image and the ground truth label; and detect a position of the target object in an image based on the feature value map by determining a core grid having a largest feature index value and determining a boundary of an area based on ratios of the feature index value of the core grid to feature index values of grids adjacent to the core grid.

6. The imaging apparatus according to claim 5, wherein the circuitry is further configured to perform activation control of in an own-apparatus on condition that a target object is recognized in the captured image by processing of image recognition using the CNN.

7. A signal processing apparatus, comprising:

circuitry configured to detect a position of a target object in an image based on a feature value map obtained in an intermediate layer of a convolutional neural network (CNN), the CNN being trained using, as training data, a ground truth label prepared for each training image and ground-truth position information indicating a position of a target object in the training image, wherein the ground-truth position information is determined based on dividing each training image into a grid and determining a percentage overlap of the target object for each section of the grid, the training data includes a first set of training images for which the ground-truth position information is prepared and a second set of training images for which the ground-truth position information is not prepared, for a training image included in the first set of training images, parameters of the CNN are updated based on a combined error obtained by combining a position error and an inferred value error, the position error is between the ground-truth position information and a position of the target object in the training image indicated by the feature value map, and the inferred value error is an error between an inferred value of the CNN with respect to the training image and the ground truth label, and the circuitry detects the position of the target object in the image based on the feature value map by determining a core grid having a largest feature index value and determining a boundary of an area based on ratios of the feature index value of the core grid to feature index values of grids adjacent to the core grid.

8. The signal processing apparatus according to claim 7, wherein the circuitry detects a position of the target object on a basis of a magnitude of a feature index value for each region in the feature value map.

9. The signal processing apparatus according to claim 8, wherein the circuitry detects, as the position of the target object, a position in which the feature index value is equal to or more than a threshold value.

10. The signal processing apparatus according to claim 7, wherein the circuitry detects, on a basis of the feature value map generated by the CNN for each of target objects of different types, a position of each the target objects in an image.

11. The signal processing apparatus according to claim 7, wherein the circuitry is further configured to perform scene estimation on a basis of a change aspect of a position of the target object detected.

12. The signal processing apparatus according to claim 11, wherein the circuitry detects, on a basis of the feature value map generated by the CNN for each of target objects of different types, a position of each of the target objects in an image, and the circuitry performs the scene estimation on a basis of a change aspect of a detected position for each the target object.

13. The signal processing apparatus according to claim 7, wherein the circuitry further performs, on condition that the target object is recognized at a specific position in an image on a basis of a result of position detection, activation control of a predetermined unit.

14. A signal processing method, comprising:

detecting, with a signal processing apparatus, a position of a target object in an image based on a feature value map obtained in an intermediate layer of a convolutional neural network (CNN), the CNN being trained using, as training data, a ground truth label prepared for each training image and ground-truth position information indicating a position of a target object in the training image, wherein the ground-truth position information is determined based on dividing each training image into a grid and determining a percentage overlap of the target object for each section of the grid, the training data includes a first set of training images for which the ground-truth position information is prepared and a second set of training images for which the ground-truth position information is not prepared, for a training image included in the first set of training images, parameters of the CNN are updated based on a combined error obtained by combining a position error and an inferred value error, the position error is between the ground-truth position information and a position of the target object in the training image indicated by the feature value map, and the inferred value error is an error between an inferred value of the CNN with respect to the training image and the ground truth label, and the detecting the position of the target object in the image based on the feature value map includes determining a core grid having a largest feature index value and determining a boundary of an area based on ratios of the feature index value of the core grid to feature index values of grids adjacent to the core grid.

15. The learning apparatus according to claim 1, wherein the target object is a human.

16. The learning apparatus according to claim 1, wherein the circuitry is further configured to acquire the feature value map by performing a convolution operation on the training image using a kernel with a predetermined size, and the feature value map indicates a feature index value for each region of the training image.

17. The learning apparatus according to claim 1, wherein the percentage overlap is indicated as a number between 0 and 1, wherein 0 indicates no overlap and 1 indicates maximum overlap.

* * * * *